United States Patent
Moran et al.

(10) Patent No.: US 11,334,345 B2
(45) Date of Patent: May 17, 2022

(54) DIFFERENTIAL FIRMWARE UPDATE GENERATION

(71) Applicant: Pelion Technology, Inc., San Jose, CA (US)

(72) Inventors: Brendan James Moran, Histon (GB); Marcus Chang, Austin, TX (US)

(73) Assignee: Pelion Technology, Inc., San Jose, CA (US)

( * ) Notice: Subject to any disclaimer, the term of this patent is extended or adjusted under 35 U.S.C. 154(b) by 0 days.

(21) Appl. No.: 17/066,188

(22) Filed: Oct. 8, 2020

(65) Prior Publication Data

US 2022/0113960 A1    Apr. 14, 2022

(51) Int. Cl.
*G06F 9/44* (2018.01)
*G06F 8/658* (2018.01)
*G06F 21/60* (2013.01)
*G06F 21/57* (2013.01)

(52) U.S. Cl.
CPC ............ *G06F 8/658* (2018.02); *G06F 21/572* (2013.01); *G06F 21/602* (2013.01); *G06F 2221/033* (2013.01)

(58) Field of Classification Search
CPC ...... G06F 8/658; G06F 21/572; G06F 21/602; G06F 2221/033
See application file for complete search history.

(56) References Cited

U.S. PATENT DOCUMENTS

| | | | |
|---|---|---|---|
| 8,214,653 B1* | 7/2012 | Marr | G06F 8/65 713/189 |
| 2007/0050762 A1* | 3/2007 | Chen | G06F 8/71 717/169 |
| 2010/0008510 A1* | 1/2010 | Zayas | G06F 21/572 380/283 |
| 2012/0179917 A1* | 7/2012 | Yach | G06F 21/629 713/189 |
| 2013/0198797 A1* | 8/2013 | Raghuram | G06F 21/57 726/1 |

OTHER PUBLICATIONS

Petri, Gustavo, Presentation at VeTSS Workshop on Verified Software Case Studies, "Software verification at Arm", Sep. 24-25, 2019, https://vetss.org.uk/wp-content/uploads/sites/122/2019/10/Petri-Software-verification-at-Arm-slides.pdf.

* cited by examiner

*Primary Examiner* — Hang Pan
(74) *Attorney, Agent, or Firm* — Nixon & Vanderhye P.C.

(57) ABSTRACT

A method of generating an output differential firmware update. Differential firmware update characteristic data is sent from a trusted execution environment (TEE) to an authorizing entity. The differential firmware update characteristic data indicates at least one characteristic associated with generation of the output differential firmware update within the TEE. The TEE obtains a key from the authorizing entity, and is thereby authorized by the authorizing entity to generate the output differential firmware update. The TEE obtains an encrypted version of a firmware portion of the firmware. The encrypted version of the firmware portion is decrypted using the key to obtain a decrypted version of the firmware portion. The output differential firmware update is generated using the decrypted version of the firmware portion.

19 Claims, 8 Drawing Sheets

DIFFERENTIAL FIRMWARE UPDATE GENERATION

BACKGROUND OF THE INVENTION

Field of the Invention

The present invention relates to generation of a differential firmware update.

Description of the Related Technology

Devices typically include firmware for implementing the functionality of the device. Firmware is for example a portion of code written to a read-only memory (ROM) of a device, comprising low-level machine-readable instructions for implementing a given functionality (for example, controlling hardware or collecting data). Firmware is typically installed at the time of manufacturing of a device, but may be updated several times during the life-cycle of a device, for example to add security patches or to improve or modify the functionality of the device.

In many cases, a single enterprise or owner may be responsible for a large number of devices, for example hundreds, thousands, or tens of thousands of similar devices. Management of a large number of devices, including for example managing data collected by the devices, managing firmware running on the devices, and managing device security, requires significant resources and infrastructure. It is desirable to reduce the burden on device owners/operators of managing firmware updates for devices, while improving the security of the firmware update process.

SUMMARY

According to a first aspect of the present disclosure, there is provided a method of generating an output differential firmware update for updating firmware associated with a device, the method comprising: sending differential firmware update characteristic data from a trusted execution environment to an authorizing entity, wherein the differential firmware update characteristic data is indicative of at least one characteristic associated with generation of the output differential firmware update within the trusted execution environment; obtaining, at the trusted execution environment, a key from the authorizing entity, the trusted execution environment thereby being authorized by the authorizing entity to generate a differential firmware update of a firmware portion of the firmware; obtaining, at the trusted execution environment, an encrypted first version of the firmware portion; decrypting, within the trusted execution environment, the encrypted first version of the firmware portion using the key to obtain a decrypted first version of the firmware portion; and generating, within the trusted execution environment, the output differential firmware update using the decrypted first version of the firmware portion and a second version of the firmware portion.

According to a second aspect of the present disclosure, there is provided a method for use in authorizing a trusted execution environment to generate an output differential firmware update for a device, the method comprising: obtaining, at an authorizing entity, differential firmware update characteristic data indicative of at least one characteristic associated with generation of the output differential firmware update within the trusted execution environment; determining, based on the differential firmware update characteristic data, that the trusted execution environment is authorized to generate the output differential firmware update; and in response to the determining, sending a key from the authorizing entity to the trusted execution environment, thereby authorizing the trusted execution environment to generate a differential firmware update of a firmware portion of the firmware, wherein the key is for decrypting an encrypted version of the firmware portion to generate a decrypted version of the firmware portion for use in generating the output differential firmware update.

According to a third aspect of the present disclosure, there is provided a computing system for generating an output differential firmware update for updating firmware associated with a device, the computing system comprising a trusted execution environment, the trusted execution environment comprising: a characteristic data component to send differential firmware update characteristic data to an authorizing entity, wherein the differential firmware update characteristic data is indicative of at least one characteristic associated with generation of the output differential firmware update within the trusted execution environment; a decryption component to: obtain a key from the authorizing entity in response to the sending of the differential firmware update characteristic data to the authorizing entity; and decrypt an encrypted first version of the firmware portion using the key to obtain a decrypted first version of the firmware portion; and a differential firmware update component to generate the output differential firmware update using the decrypted first version of the firmware portion and a second version of the firmware portion.

DETAILED DESCRIPTION OF CERTAIN INVENTIVE EMBODIMENTS

Figure 1:
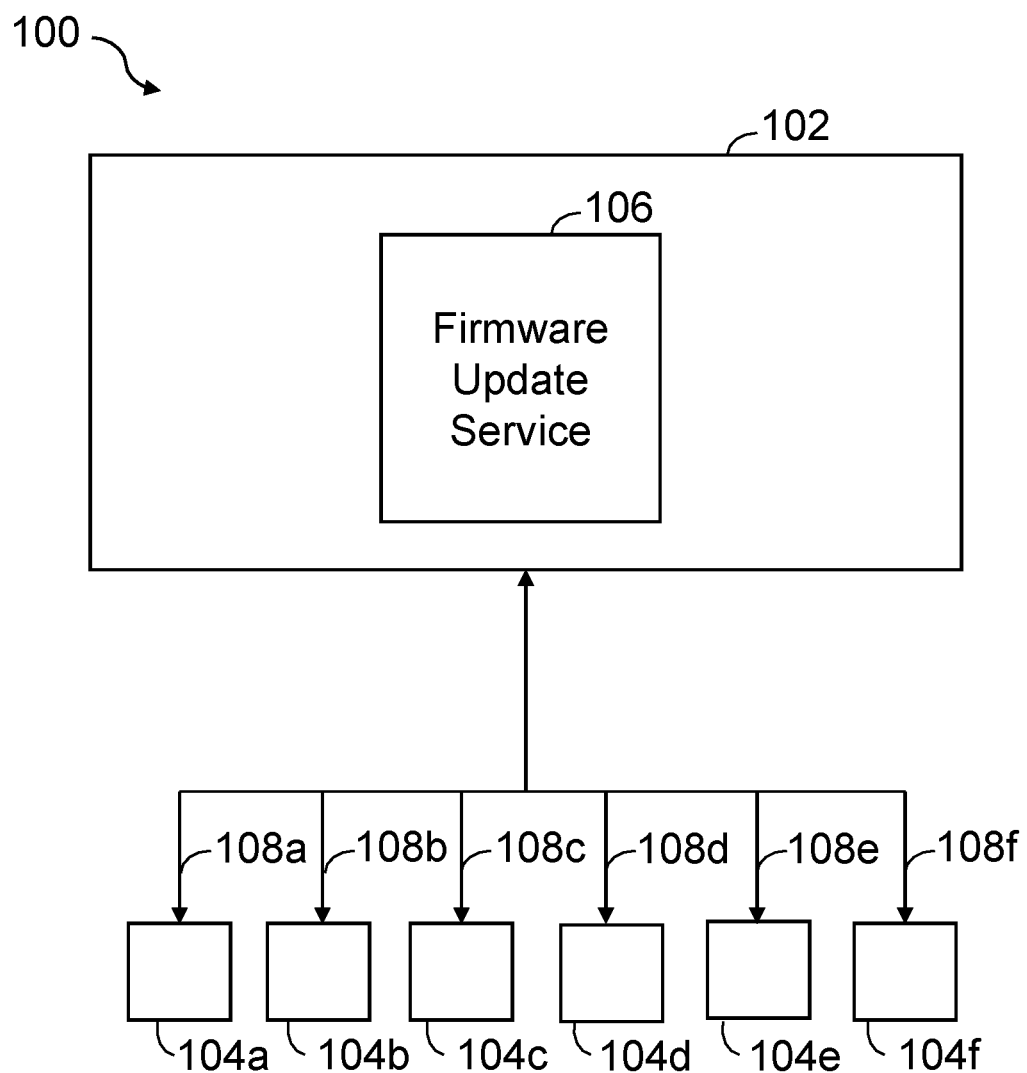
FIG. 1 is a schematic diagram showing a system for deploying a firmware update to a set of devices according to examples.

Details of systems and methods according to examples will become apparent from the following description, with reference to the Figures. In this description, for the purpose of explanation, numerous specific details of certain examples are set forth. Reference in the specification to "an example" or similar language means that a particular feature, structure, or characteristic described in connection with the example is included in at least that one example, but not necessarily in other examples. It should further be noted that certain examples are described schematically with certain features omitted and/or necessarily simplified for ease of explanation and understanding of the concepts underlying the examples.

In examples herein, an output differential firmware update for updating firmware associated with a device is generated. Generating the output differential firmware update involves sending differential firmware update characteristic data from a trusted execution environment to an authorizing entity, which is for example associated with an author of a firmware portion of the firmware. The differential firmware update characteristic data is indicative of at least one characteristic associated with generation of the output differential firmware update within the trusted execution environment, and is for example used by the authorizing entity to determine whether the trusted execution environment is authorized to generate a differential firmware update of the firmware portion. The authorizing entity therefore has the authority to authorize the generation of differential firmware updates using the firmware portion. In this way, the authorizing entity can control the use of the firmware portion for the generation of differential firmware updates. This improves the security of the update process, by increasing the confidence of the authorizing entity that the firmware portion will be processed securely in the generation of the differential firmware update, e.g. using an authorized algorithm that is secure. In general, a system that is capable of computing a differential firmware update has the ability to replace the firmware of a device. In this way, a malicious system could inject malware by deploying a differential firmware update to a device. The approaches described herein reduce the risk of malware attacks in this manner because the authorizing entity can verify, using the differential firmware update characteristic data, that the differential firmware update computation is trustworthy before granting access to the firmware portion. This can also reduce the risk of misuse of the firmware portion or the use of an insecure differential firmware update calculation that risks exposure of sensitive or confidential information (such as the versions of the firmware portion).

If the trusted execution environment is authorized to generate the output differential firmware update, the trusted execution environment receives or otherwise obtains a key from the authorizing entity. The trusted execution environment uses the key to decrypt an encrypted version of the firmware portion to obtain a decrypted version of the firmware portion, and uses the decrypted version of the firmware portion to generate the output differential firmware update. For example, where the decryption version is a decrypted first version of the firmware portion, the trusted execution environment can generate the output differential firmware update by computing a difference between the decrypted first version of the firmware portion and a second version of the firmware portion, which is different from the first version of the firmware portion.

This approach for example allows the output differential firmware update to be generated within the trusted execution environment, rather than by the authorizing entity. The burden of the authorizing entity (which may be an author of the firmware portion rather than a dedicated firmware update system, and hence may lack the resources or infrastructure to manage the deployment of differential firmware updates across a fleet of devices) is hence reduced. The output differential firmware update may be generated more securely within the trusted execution environment than in other environments, as access to the trusted execution environment is typically highly restricted. For example, the trusted execution environment may prevent the execution of applications at risk of exposing data. In this way, an output differential firmware update can be generated more securely than otherwise, and in a manner that reduces the burden on an authorizing entity, such as the author of the firmware to be updated, but is nevertheless compliant with security requirements that may be imposed by the authorizing entity.

FIG. 1 is a schematic diagram showing a system 100 including a device management system 102 and a set of devices 104 (of which six devices 104a-f are shown). In this example, the set of devices 104 are wireless devices and have the capability to communicate with the firmware update service 102 via a core network and a radio access network (RAN).

The devices 104 may be a set of Internet of Things (IoT) devices. The Internet of things (IoT) describes a system of interconnected electronic devices, each of which has a unique identifier and a capability to transfer data over the Internet without requiring human intervention. Examples of such devices range from household appliances such as lighting fixtures, doorbells, audio speakers, televisions, washing machines and refrigerators, to energy or water meters, sensing devices and vehicles. Providing such devices with network connectivity allows for a wide range of functionalities to be implemented, for example performance monitoring, data gathering, real-time analytics and/or remote control of devices. In an example in which the set of devices 104 are a set of Internet of Things (IoT) devices, the set of devices 104 may communicate with the device management system 102 using wireless signals in accordance with the narrowband IoT (NB-IoT) standard, which has been developed from the Long Term Evolution (LTE) and Long Term Evolution-Advanced (LTE-A) standards to address specific requirements associated with IoT devices, including a potentially large number of devices within a given area, low data rates, low power consumption, and low signal-to-noise ratio (for example where a device is deployed in a remote or enclosed area). In other examples, the set of devices 104 may have integrated or externally-coupled wired networking capabilities to communicate with the device management system 102.

The device management system 102 is a system for managing one or more devices. Managing devices may for example include managing data collected by the devices, managing firmware running on the devices, troubleshooting the devices, and/or managing device security. As noted above, a single enterprise or owner may be responsible for a large number of devices, which often requires significant resources and infrastructure. The device management system 102 helps to reduce the burden experienced by the single enterprise or owner of managing the large number of devices. The device management system 102 may for example be a cloud-based device management platform.

In FIG. 1, the device management system 102 includes a firmware update service 106 for managing firmware running on the devices 104. In this example, the firmware update service 106 deploys a set of firmware updates 108 (of which six firmware updates 108a-f are shown) to their respective devices in the set of devices 104. In some examples, the firmware updates 108 are tailored to each of the set of devices 104 such that some of the devices 104 receive the same firmware update 108 whereas other devices 104 receive a different firmware update 108.

Each of the set of devices 104 may for example include processing circuitry in the form of a microcontroller, and memory which may for example be non-volatile flash memory. In one example, the memory stores code including a bootloader, a metadata header and an active firmware image. The active firmware image currently running on the device may be stored in an active image slot in the memory. The memory may also further include a spare image slot for storing a replacement firmware image during a firmware update procedure. The active firmware image includes an operating system (OS), an update client, and a user application. In some examples, the devices 104 use the Mbed® OS by Arm®, though other choices of OS may be used, for example the Raspberry Pi® OS or a real-time operating systems (RTOS) such as RTX by Arm® or FreeRTOS. In this example, the bootloader, metadata header and firmware image on a given device 104*a-f* are installed by the manufacturer of the device 104*a-f* before the device 104*a-f* is sold. In other examples, firmware may be installed at a later date and/or by a different entity than the manufacturer of the device.

Once the bootloader has been installed on a given device 104*a-f*, the bootloader is never updated, and is responsible for ensuring that only a valid firmware image ever loads on the device 104*a-f*. In this example, the bootloader is placed at an allocated start address (for example, address 0x0). The bootloader is therefore executed by the microcontroller each time the device 104*a-f* boots. The metadata header contains information about the active firmware image, including a hash of the firmware image, and is used by the bootloader for validating the active firmware image before loading. A new metadata header is provided each time the active firmware image is updated on the device 104*a-f*. The update client on the device 104*a-f* is responsible for handling firmware updates.

One way of updating firmware on one of the devices is for the firmware update service to prepare an entirely new firmware image and transmit the entirely new firmware image to one of the devices, so that the update client on that device can replace the active firmware image with the entirely new firmware image. However, in many cases, only part of the firmware image is actually modified when the firmware is to be updated. In such cases, transmitting an entirely new firmware image is inefficient, resulting in unnecessary use of network resources and energy at the device, which may be limited for example if the device does not have access to a mains power supply.

An alternative method is to generate a differential firmware update, also referred to as a delta update or a delta image. The differential firmware update includes only the modified part or parts of the firmware image, along with information necessary to create the new firmware image, for example including information from which memory addresses of the updated parts of the firmware image can be derived. Transmitting a firmware update as a differential firmware update, rather than an entire replacement firmware image, can save network resources and energy consumed by the device, for example when a new firmware image only includes small code changes relative to the active firmware image.

One way of generating differential firmware updates involves sending encrypted versions of the active firmware image and the replacement firmware image to the firmware update service, along with one or more keys to decrypt the encrypted firmware versions. In this case, the firmware update service can then generate differential firmware updates for each of the devices using decrypted versions of the active firmware image and the replacement firmware image. For a given device of the devices, the firmware update service can then compare the active firmware image with the new firmware image, determine which part(s) of the firmware image have been modified, and prepare a differential firmware update including the modified part(s) of the firmware image and information indicating where the modified part(s) need to be inserted.

Generating the differential firmware updates in this way requires the firmware update service to have access to the active firmware image, the replacement firmware image and the one or more keys required to decrypt their encrypted versions. This may not be desirable, though, because the operations performed by the firmware update service to generate the differential firmware update may be insecure, which may e.g. risk malware being injected into the device. With this approach, an authorizing entity, such as a computing system operated by an author of the firmware or a further computing system that is nevertheless permitted by the author to distribute the firmware, does not have any knowledge of how the firmware images are processed by the firmware update service to generate the differential firmware update. As it can be difficult to distinguish between malicious tampering (e.g. to inject malware) masquerading as a differential firmware update and a genuine differential firmware update, the authorizing entity (or the device itself) may be unable to identify whether a purported differential firmware update includes malicious code. This approach hence risks exposing devices to cyber-attacks, such as malware attacks, and/or to exposing the firmware images to malicious third parties To address this, the firmware update service could instead provide code to implement a differential firmware calculation algorithm to the authorizing entity, so that the authorizing entity need not send the firmware images and/or the key(s) to the firmware update service. However, this involves the firmware update service sharing the code to implement the differential firmware calculation algorithm with the authorizing entity, which may be undesirable as the differential firmware calculation algorithm may itself be confidential or otherwise sensitive. Furthermore, with this approach, the firmware update service does not have any information concerning how the authorizing entity will use the code to implement the differential firmware calculation algorithm, meaning that the algorithm may be used in an insecure or otherwise undesirable manner. In addition, the authorizing entity may not have the resources or infrastructure to deploy the differential firmware update to a large number of devices.

It is desirable to be able to securely generate a differential firmware update that accounts for the mutual distrust between a firmware update service and an authorizing entity, e.g. associated with an author of the firmware. Examples herein provide such an approach, and for example allow for a differential firmware update to be generated in a way which reduces the risk of a device being exposed to malicious code. The examples herein can also reduce the risk of confidential or otherwise sensitive information being exposed to an untrusted party.

The examples herein can be implemented using the system 100 of FIG. 1. In such cases, an output differential firmware update is generated by a further element (a trusted execution environment, discussed further below with reference to FIGS. 2 to 7). The output differential firmware update 108 can then be sent to the firmware update service 106 for deployment to the devices 104. In other cases, though, the output differential firmware update can be deployed to the devices via a different component, such as an authorizing entity or another component.

Figure 2:
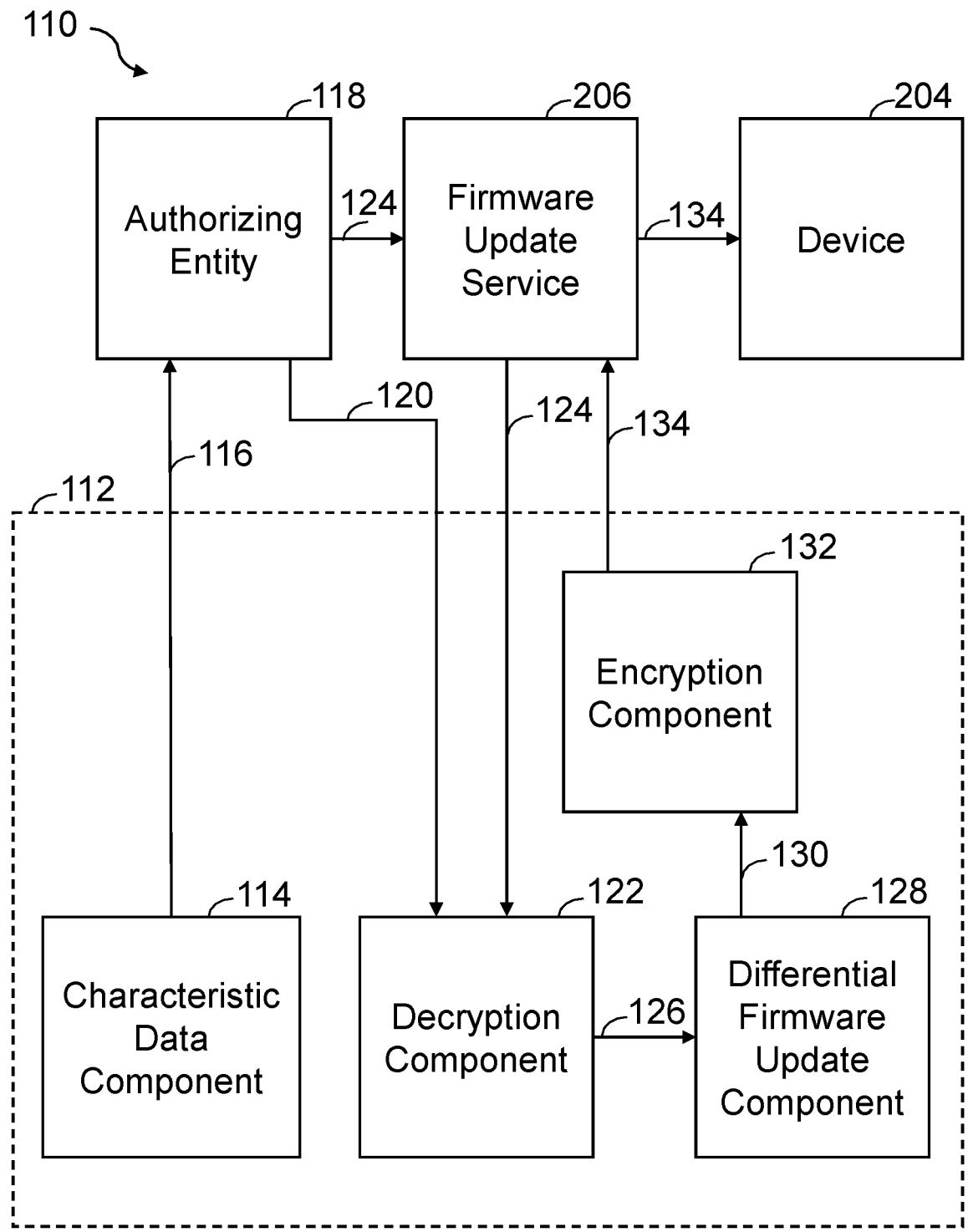
FIG. 2 is a schematic diagram showing a method of generating a differential firmware update for updating firmware associated with a device according to examples.

FIG. 2 is a schematic diagram showing a method 110 of generating, within a trusted execution environment 112, a differential firmware update for updating firmware associated with a device 204 according to examples. The differential firmware update generated using the methods herein may be referred to as an output differential firmware update. The device 204 may for example be one of the set of devices 104 described above with reference to FIG. 1. The method 110 of FIG. 2 may be performed by a computing system that includes a trusted execution environment, as described in more detail below with reference to FIG. 8.

A trusted execution environment, which may also be referred to as an enclave, is a hardware- and/or software-enforced private, isolated region of memory within a processor of a computing system such as a central processing unit (CPU) for example. Due to this arrangement, only certain applications, often referred to as trusted applications, can be run inside the trusted execution environment. A trusted execution environment may be an isolated region of memory within the computing system in the sense that this region of memory is separated from a main operating system of the computing system that runs non-trusted applications. Running a limited number of trusted applications in the trusted execution environment reduces the risk of exposure of data processed in the trusted execution environment to a malicious party, for example because fewer applications can access this data. In addition, the applications that can access the trusted execution environment are typically secure applications that are less likely to expose data to other parties than insecure applications. In some cases, a trusted execution environment restricts access to given data owned by (e.g. generated by or otherwise associated with) a trusted application to solely that trusted application. In other cases, though, at least one further application may be able to access such data. The number of applications capable of accessing given data within a trusted execution environment generally depends on the trusted application associated with the data. Nevertheless, the number of applications capable of accessing the data generated by a given trusted application within a trusted execution environment is generally restricted, and may be limited to solely a secure monitor application (which e.g. acts similarly to a hypervisor) and the trusted application that owns the data. A trusted execution environment may be implemented using an embedded hardware technology such as TrustZone® by Arm® which may control the data that can be processed within the trusted execution environment and the software that is used to process this data.

The method 110 of FIG. 2 may be initiated in response to a new version of a firmware portion becoming available, where it is to be appreciated that the firmware portion may be all or part of the firmware associated with the device 204. For example, an authorizing entity 118, which is for example an entity that is permitted to authorize a differential firmware update of a firmware portion of the firmware, may send a message to the trusted execution environment 112 indicating the availability of a new version of the firmware portion, or otherwise indicate to the trusted execution environment 112 that the firmware portion is to be updated. In other cases, though, such a message may be received by the trusted execution environment 112 from a different entity, such as a firmware update service 206, which may be similar to the firmware update service 106 discussed with reference to FIG. 1. In yet further cases, the trusted execution environment 112 may periodically check for the availability of new version of the firmware portion, e.g. by querying the authorizing entity 118 and/or the firmware update service 206, and may instigate the generation of the output differential firmware update if a new version of the firmware portion is available.

Once the generation of the output differential firmware update has been initiated, the method 110 of FIG. 2 involves a characteristic data component 114 operating within the trusted execution environment 112 sending differential firmware update characteristic data 116 from the trusted execution environment 112 to an authorizing entity 118. The authorizing entity 118 in this example is associated with an author of at least one version of the firmware portion, e.g. the original version of the firmware portion installed on the device or a subsequent version of the firmware portion. For example, the authorizing entity 118 may be a computing system operated by the author. In other examples, though, the authorizing entity 118 is another entity that is not associated with the author, e.g. that is operated by a different party. In such cases, the authorizing entity 118 may nevertheless have been permitted by the author of the firmware portion to distribute the firmware portion and/or updates of the firmware portion. Permitting the other entity in this way may include providing the other entity with a key or keys to encrypt and/or decrypt at least one version of the firmware portion.

The differential firmware update characteristic data 116 is indicative of at least one characteristic associated with generation of the output differential firmware update within the trusted execution environment 112. The at least one characteristic for example provides some information regarding how the output differential firmware update will be generated. The differential firmware update characteristic data 116 in this case therefore allows the authorizing entity 118 to determine whether the output differential firmware update will be generated in a sufficiently secure manner (e.g. in a manner that is not susceptible to malware attacks) and/or in a manner that complies with an intended use of the firmware portion by the authorizing entity. For example, the at least one characteristic may indicate the differential firmware update calculation algorithm that will be used and/or at least one security feature of the trusted execution environment 112 within which the output differential firmware update will be generated. Generation of differential firmware update characteristic data 116 is discussed further with reference to FIG. 4.

The differential firmware update characteristic data 116 may be in any suitable form, and may represent at least one of a flag, a numerical indicator or a binary indicator. The authorizing entity 118 determines, based on the differential firmware update characteristic data 116, whether the trusted execution environment 112 is authorized to generate a differential firmware update of the firmware portion. For example, the authorizing entity 118 may process the differential firmware update characteristic data 116 to identify whether the at least one characteristic satisfies a predetermined condition for generation of the output differential firmware update to be considered secure, e.g. that the differential firmware update calculation algorithm is of a particular type and/or that the trusted executed environment 112 is isolated in a particular way from other regions of memory, and so on.

In response to determining that the trusted execution environment 112 is authorized to generate a differential firmware update of the firmware portion, the authorizing entity 118 sends at least one key 120 to a decryption component 122 within the trusted execution environment 112. In this way, the authorizing entity 118 authorizes the trusted execution environment 112 to generate the output differential firmware update. In examples described herein, a key is for example a cryptographic key, which may be in the form of a random sequence of characters generated by a random number generator or a pseudorandom number generator. In other examples, the key may be derived deterministically using a key derivation function that may use a password or passphrase to derive the key. The at least one key 120 is used in the decryption of encrypted version(s) of the firmware portion 124, as described in more detail below.

If, however, the authorizing entity 118 determines that the trusted execution environment 112 is not authorized to generate a differential firmware update of the firmware portion, e.g. if application of the differential firmware update calculation algorithm would unduly risk the injection of malware and/or exposure of a version of the firmware portion to a malicious party, the authorizing entity 118 does not send the at least one key 120 to the trusted execution environment 112. In this case, the trusted execution environment 112 is unable to decrypt an encrypted version of the firmware portion 124 to be used to generate the output differential firmware update (even if the trusted execution environment 112 is somehow able to obtain the encrypted version). The trusted execution environment 112 is hence unable to perform the (in this case, insufficiently secure) differential firmware update calculation. The authorizing entity 118 can hence control how the differential firmware update calculation is performed, and can selectively authorize the trusted execution environment 112 to generate an output differential firmware update in a way that satisfies a security requirement set by the authorizing entity 118.

In the method 110 of FIG. 2, the authorizing entity 118 trusts that the differential firmware update characteristic data 116 provided by the trusted execution environment 112 accurately reflects the at least one characteristic associated with generation of the output differential firmware update. Such trust can be assumed due to the nature of the trusted execution environment 112, but in some cases is further confirmed using a remote attestation protocol, as discussed further with reference to FIG. 4.

In the method 110 of FIG. 2, the authorizing entity 118 sends a plurality of encrypted versions of the firmware portion 124 to the firmware update service 206. The plurality of encrypted versions may be sent sequentially, as each new version of the firmware portion is created. For example, the authorizing entity 118 (which in this case is associated with the author of each of the versions), may send an encrypted first version of the firmware portion 124 to the firmware update service 206, corresponding to the version of the firmware portion currently installed on the device 204 (which may be the version of the firmware portion initially installed on the device 204, if the firmware of that device 204 has not yet been updated). The authorizing entity 118 may subsequently send an encrypted second version of the firmware portion 124 to the firmware update service 206, corresponding to an updated version of the firmware portion. In other cases, though, the plurality of encrypted versions (such as the first and second versions) may be sent together from the authorizing entity 118 to the firmware update service 206. As explained further below, though, in some cases, the second version may not be encrypted and/or may be obtained from a different source than the encrypted first version of the firmware portion 124.

In the example of FIG. 2, the firmware update service 206 stores the plurality of encrypted versions of the firmware portion 124 in suitable storage. The firmware update service 206 in this case additionally has access to a record, e.g. in the form of a database, providing information about the respective versions of the firmware portion. The database may be stored locally within the firmware update service 206 or at a suitable remote server. Such a database may include the versions of the firmware portion that are available (including an indication of which version is the most up to date version), and/or the version(s) of the firmware portion that are deployed on respective devices of a plurality of devices managed by the firmware update service 206, which may be referred to as the active firmware. The database may also or instead include respective digests of the versions of the firmware portion (e.g. corresponding to digests of firmware images, respectively). The database may be updated periodically based on information from the authorizing entity 118 (e.g. indicating that a new version of the firmware portion is available) and/or the firmware update service 206 may query respective devices to determine which version of the firmware portion a given device is using. In examples in which the database includes digests, the firmware update service 206 may match a reported digest (e.g. obtained from a particular device, and indicating a currently installed firmware version) with a digest stored in the database, in order to obtain a copy of the firmware version installed on that particular device. As the firmware portion 124 may be all or part of the firmware of a given device, the firmware portion 124 can be obtained by obtaining the copy of the firmware version installed on a device.

In this example, the versions of the firmware portion stored by the firmware update service 206 are encrypted versions to further enhance security. In this example, the plurality of encrypted versions of the firmware portion 124 were encrypted by the authorizing entity 118 using the at least one key 120 before sending the encrypted versions to the firmware update service 206. The at least one key 120 is not provided to the firmware update service 206, meaning that the firmware update service 206 is unable to decrypt the plurality of encrypted versions of the firmware portion 124. This improves the security of the method 110, by preventing the firmware update service 206 (which may be untrusted by the authorizing entity 118) from decrypting the versions of the firmware portion 124.

In the method 110 of FIG. 2, the trusted execution environment 112 obtains the plurality of encrypted versions of the firmware portion 124. A decryption component 122 of the trusted execution environment 112 decrypts the plurality of encrypted versions of the firmware portion 124 using the at least one key 120 to obtain a plurality of decrypted versions of the firmware portion 126. A single key may be used to decrypt more than one of the encrypted versions of the firmware portion 124, or different versions of the firmware portion may be decrypted using different respective keys. In other examples, though, it is to be appreciated that a single encrypted version of the firmware portion 124 is obtained, rather than obtaining a plurality of encrypted versions. In these examples, the at least one key 120 (e.g. a single key) is used to decrypt the encrypted version of the firmware portion (e.g. an encrypted first version of the firmware portion) to obtain a decrypted version of the firmware (e.g. a decrypted first version of the firmware portion).

A differential firmware update component 128 of the trusted execution environment 112 generates an output differential firmware update 130 using the plurality of decrypted versions of the firmware portion 126, e.g. by calculating a difference between the plurality of decrypted versions of the firmware 126 using a suitable differential firmware update calculation algorithm. As explained above with reference to FIG. 1, this for example involves determining which part(s) of the firmware portion have changed between the respective versions and preparing an output differential firmware update 130 that includes the modified part(s) and an indication of where within one of the versions (e.g. the currently deployed version) of the firmware portion the modified part(s) are to be inserted. In general, the plurality of encrypted versions of the firmware portion 124 includes two versions. However, in some cases there may be more than two versions of the same firmware portion, such as a currently deployed version and two new versions. In such cases, conflicts between respective versions of the same firmware portion that may arise during the determination of which part(s) of the firmware portion have been modified may be resolved using any suitable conflict resolution protocol. Furthermore, in some cases, the output differential firmware update 130 may be generated using a decrypted first version of the firmware portion and a second version of the firmware portion, which may have been decrypted previously (e.g. using the same or a different key as that used to decrypt the first version of the firmware portion), and which may have been obtained from the same or a different source than the first version of the firmware portion.

After generating the output differential firmware update 130, the output differential firmware update 130 may be encrypted for deployment to the device 204. This is the case in FIG. 2, in which the output differential firmware update 130 is encrypted by an encryption component 132 within the trusted execution environment 112. The output differential firmware update 130 may be encrypted using the at least one key 120 previously used to decrypt the encrypted version(s) of the firmware portion 124 or by another key.

In the method 110 of FIG. 2, the encrypted differential firmware update 134 is sent to the firmware update service 206 for deployment to the device 204. In this way, the firmware update service 206 obtains an encrypted differential firmware update 134, to reduce the risk of the firmware update service 206, which may not be as trustworthy as the trusted execution environment 112, gaining unauthorized access to the output differential firmware update 130. The firmware update service 206 sends the encrypted differential firmware update 134 to the device 204. The encrypted differential firmware update 134 is decrypted and an update client on the device replaces the part(s) of the firmware portion to be modified with the modified part(s) indicated by the differential firmware update. The encrypted differential firmware update 134 may be decrypted by the device 204 or by another device, e.g. a trusted intermediary, such as a gateway, which is trusted to decrypt differential firmware updates on behalf of the device 204. The decryption key(s) (for decrypting the encrypted differential firmware update 134) can be shared with the device 204 or the other device in various ways. For example, the decryption key(s) may be shared using an active key-delivery scheme such as out-of-band key delivery (e.g. using a management or other provisioning system), using a group key exchange protocol, or using a broadcast key agreement protocol. In other examples, the key(s) may be or include a pre-shared key (PSK).

Figure 3:
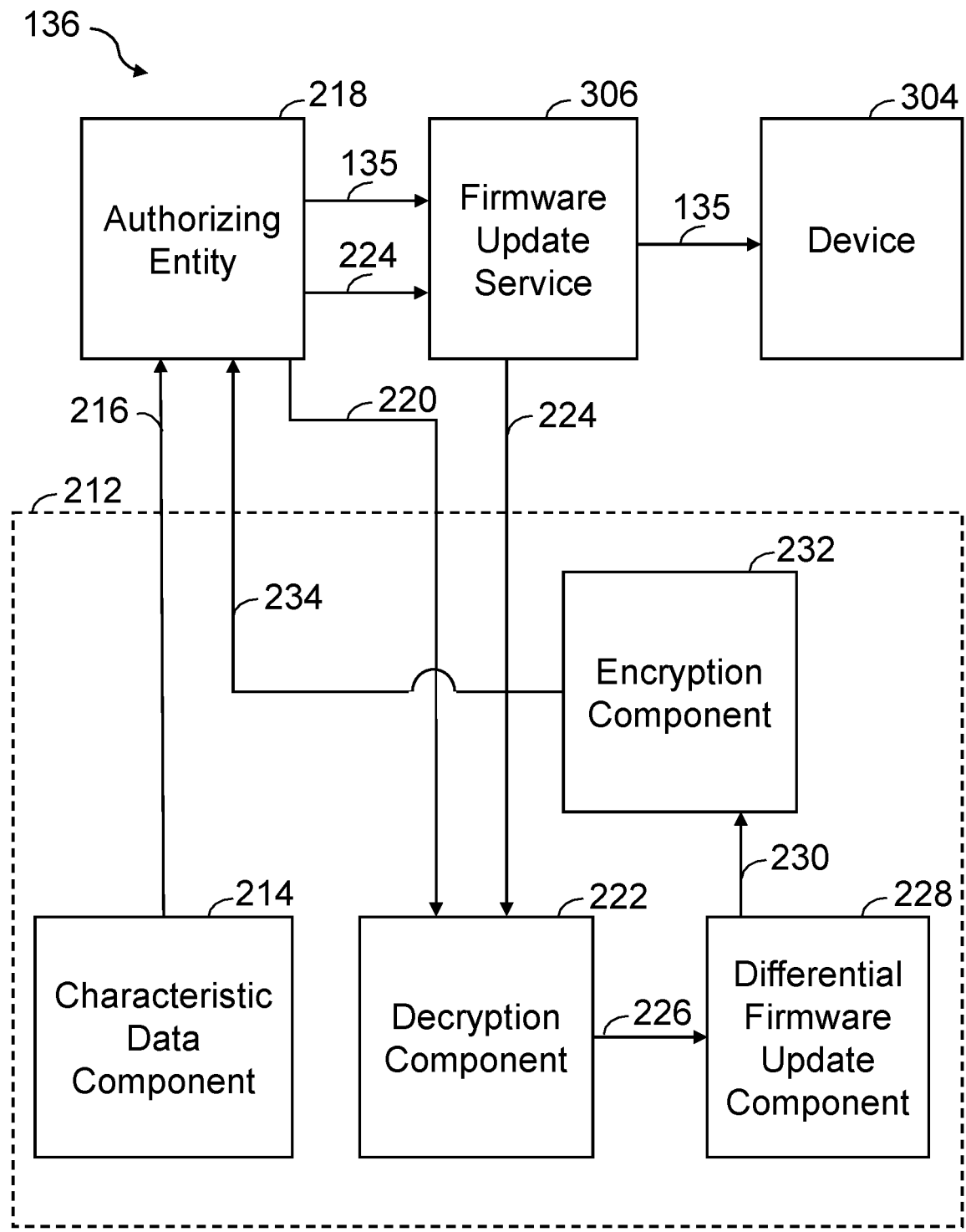
FIG. 3 is a schematic diagram showing a method of generating a differential firmware update for updating firmware associated with a device according to further examples.

In another example, the encrypted differential firmware update may be output from the trusted execution environment to a different entity before deployment to the device. For example, FIG. 3 is a schematic diagram showing a method 136 of generating an output differential firmware update for updating firmware associated with a device 304 according to further examples. Features of FIG. 3 similar to corresponding features of FIG. 2 are labelled with the same reference numeral but incremented by 100; corresponding descriptions are to be taken to apply.

In the method 136 of FIG. 3, a plurality of encrypted versions of a firmware portion 224 of the firmware of the device 304 are sent from an authorizing entity 218 to a firmware update service 306, and from the firmware update service 306 to a trusted execution environment 212. Differential firmware update characteristic data 216 is sent from a characteristic data component 214 of the trusted execution environment 212 to an authorizing entity 218. The authorizing entity 218 determines that the trusted execution environment 212 is authorized to generate a differential firmware update of the firmware portion, and sends at least one key 220 to a decryption component 222 of the trusted execution environment 212. The decryption component 222 decrypts the plurality of encrypted versions of the firmware portion 224 using the at least one key 220, and sends a plurality of decrypted versions of the firmware portion 226 to a differential firmware update component 228 of the trusted execution environment 212. The differential firmware update component 228 uses the plurality of decrypted versions of the firmware portion 226 to generate an output differential firmware update 230, which is encrypted by an encryption component 232 of the trusted execution environment 212. As in FIG. 2, it is to be appreciated that further examples are envisaged that are otherwise similar to FIG. 3, but in which a single encrypted version of the firmware portion 224 is obtained and decrypted, rather than obtaining a plurality of encrypted versions. In such cases, the output differential firmware update 230 may be generated using a decrypted first version of the firmware portion and a second version of the firmware portion, which may have been decrypted previously (e.g. using the same or a different key as that used to decrypt the first version of the firmware portion), and which may have been obtained from the same or a different source than the first version of the firmware portion.

In the method 136 of FIG. 3, the encryption component 232 encrypts the output differential firmware update 230 using the at least one key 220 used to encrypt the version(s) of the firmware portion. For example, output differential firmware update 230 may represent a difference between first and second versions of the firmware portion, which are e.g. a currently deployed version and a newly-created version. The at least one key 220 may include first and second keys associated with the first and second versions of the firmware portion, respectively. In this case, the output differential firmware update 230 may be encrypted using one of the at least one key 220, such as the second key associated with the second (updated) version of the firmware portion. The encrypted differential firmware update 234 output by the encryption component 232 is sent to the authorizing entity 218 instead of the firmware update service 306. As the authorizing entity 218 already has access to the at least one key 220 (e.g. including the second key), there is no need to share the at least one key 220 with the authorizing entity 218 for the authorizing entity 218 to be able to decrypt the encrypted differential firmware update 234. This simplifies the method 136.

Sending the encrypted differential firmware update 234 to the authorizing entity 218 before being sent to the device may allow for the authorizing entity 218 to inspect or otherwise audit the encrypted differential firmware update 234 before deployment to the device 304. In this case, the authorizing entity 218 may for example check to see whether the update to be applied to the device 304 is as expected given the information input into the trusted execution environment 212.

In this case, the authorizing entity 218 decrypts the encrypted differential firmware update 234 using the at least one key 220, and then audits the differential firmware update 234 e.g. to check for tampering. The authorizing entity 218 then re-encrypts the differential firmware update to generate a further encrypted differential firmware update 135. The further encrypted differential firmware update 135 may be encrypted using the at least one key 220. With this approach, the authorizing entity 218 for example distributes the at least one key 220 to the devices that are to receive the differential firmware update, without involvement from the trusted execution environment 212. In this way, each differential firmware update that results in the same firmware version can be encrypted using the same key (albeit with different initialization vectors, e.g. for the Advanced Encryption Standard, AES, specification). In other cases, though, the authorizing entity 218 re-encrypts the differential firmware update with a different key than the at least one key 220, which is distributed to the devices that are to receive the differential firmware update using any suitable key distribution protocol. The further encrypted differential firmware update 135 is deployed to the device 304 via the firmware update service 306 in the method 136 of FIG. 3. This avoids burdening the authorizing entity 218 with the task of deploying the further encrypted differential firmware update 135 individually to each of the devices 304 that are to receive the update. Instead, this task is delegated to the firmware update service 306, which is typically better equipped for this purpose than the authorizing entity 218. In other cases, though, the authorizing entity 218 may itself distribute the encrypted differential firmware update 234 to the devices 304. In such cases, the authorizing entity 218 may or may not decrypt the encrypted differential firmware update 234 before deployment to the devices 304.

Figure 4:
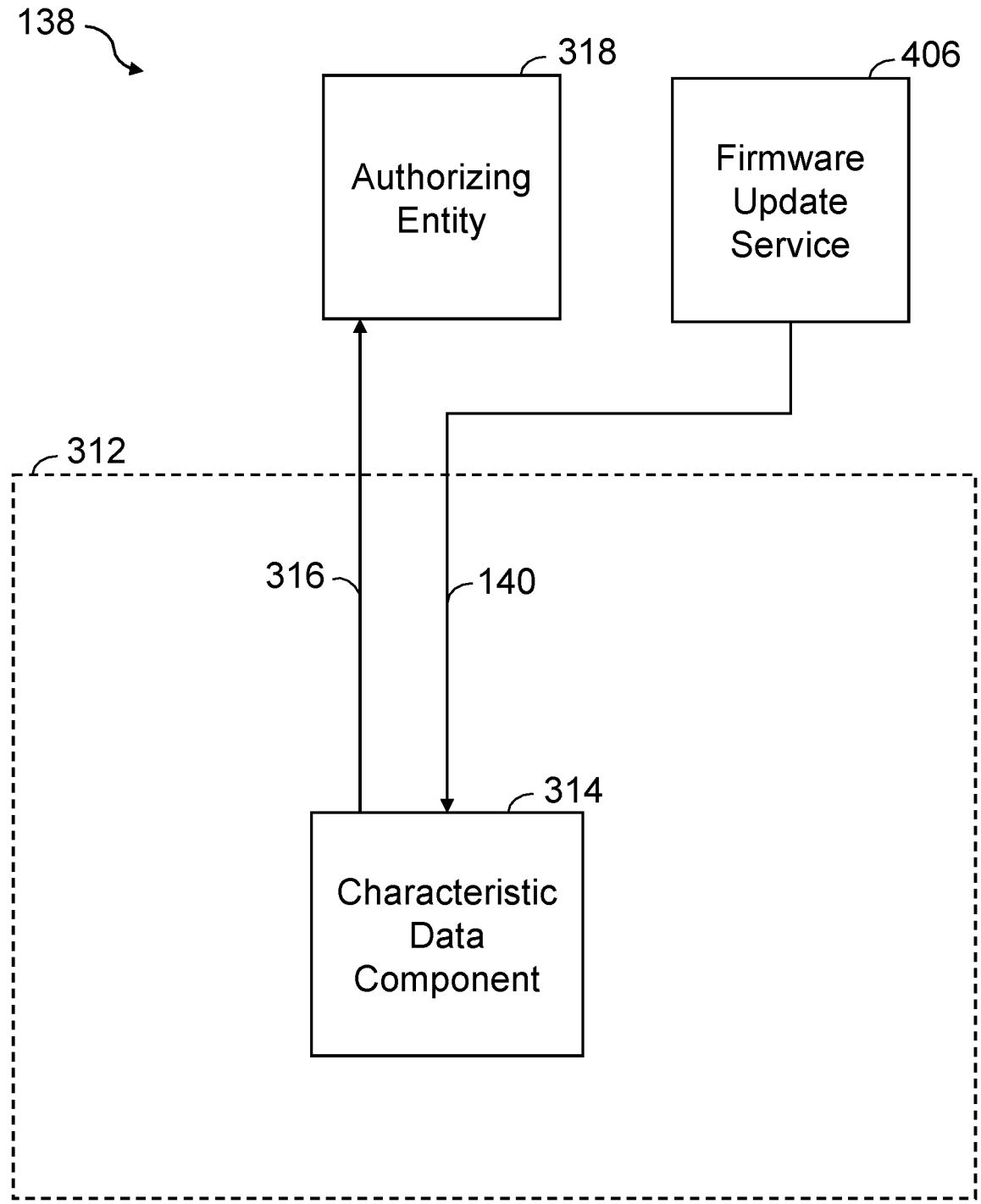
FIG. 4 is a schematic diagram showing a method of generating differential firmware update characteristic data according to examples.

FIG. 4 is a schematic diagram showing a method 138 of generating differential firmware update characteristic data 316 according to examples. Features of FIG. 4 similar to corresponding features of FIG. 2 are labelled with the same reference numeral but incremented by 200; corresponding descriptions are to be taken to apply.

In the method 138 of FIG. 4, the characteristic data component 314, within the trusted execution environment 312, obtains code 140, for example computer program code, to implement a differential firmware update calculation algorithm for generating the differential firmware update (which may be referred to herein as an algorithm, for brevity). In the method 138 of FIG. 4, the code 140 to implement the algorithm is obtained from the firmware update service 406. In this example, the differential firmware update process is a distributed method, where the entity that provides the algorithm to perform the update (the firmware update service 406) is different from the entity that provides the respective versions of the firmware portion to be updated (the authorizing entity 318). These entities may be mutually distrustful. However, in examples herein the entities do not need to share their data with each other, allowing the firmware update to be performed despite this mutual distrust. A method to obtain the code 140 to implement the algorithm is described in more detail below with reference to FIG. 5. Furthermore, it is to be understood that in other examples, the code 140 to implement the algorithm may be obtained from a different entity, such as the authorizing entity 318 or a separate computing system not shown in FIG. 4.

In the method 138 of FIG. 4, the characteristic data component 314 generates the differential firmware update characteristic data 316 based on the code 140. In this example, the differential firmware update characteristic data 316 represents at least one characteristic of the algorithm, such as which algorithm is to be applied and/or a feature of the algorithm that has a bearing on how securely the algorithm can be performed. In this way, the trusted execution environment 312 is for example able to prove to the authorizing entity 318 which algorithm is going to be applied to the plurality of decrypted versions of the firmware portion. The authorizing entity 318 can therefore determine whether the use of this algorithm is likely to risk the injection of malware and/or the exposure of confidential or otherwise sensitive information, such as the versions of the firmware portion used to generate the output differential firmware update.

The trusted execution environment 312 sends the differential firmware update characteristic data 316 to the authorizing entity 318. The authorizing entity 318 then uses the differential firmware update characteristic data 316 to determine whether the trusted execution environment 312 is authorized to generate the output differential firmware update, as described above with reference to FIG. 2.

The authorizing entity 318 retains the differential firmware update characteristic data 316 in some cases. This allows the authorizing entity 318 to identify whether the differential firmware update characteristic data 316 received from the trusted execution environment 312 subsequently for the same algorithm matches the retained differential firmware update characteristic data 316.

The authorizing entity 318 may request that a particular algorithm (or an algorithm with a particular characteristic) is applied by the trusted execution environment 312 to calculate the differential firmware update. In such cases, the trusted execution environment 312 may send the differential firmware update characteristic data 316 to the authorizing entity 318 in response to the request, to prove that the desired algorithm will be applied.

In some examples, the differential firmware update characteristic data 316 may be sent to the authorizing entity 318 without sending the actual code 140 to implement the algorithm. This means that the code 140 to implement the algorithm will not be exposed to the authorizing entity 318. This improves the security of the code 140, which may be itself be confidential or otherwise sensitive to the extent that the firmware update service 406 does not wish to share this with untrusted parties, such as the authorizing entity 318 for example. In such cases, the code 140 may have been previously audited, e.g. by the authorizing entity 318 or a third party, or the code 140 may be initially assumed to be trusted, and audited subsequently by testing of the code 140 by a suitable entity, such as the authorizing entity 318 or a third party. However, in other examples in which the code 140 is sent to the authorizing entity 318 as part of the differential firmware update characteristic data 316, the authorizing entity 318 can audit the code 140 upon receipt of the differential firmware update characteristic data 316.

In some cases, the algorithm implemented by the code 140 is considered to be unchanging once the code 140 has been audited. However, in these cases, the differential firmware update characteristic data 316 itself changes in response to changes in the algorithm, e.g. to fix bugs or improve the performance of the algorithm. The updated algorithm can then be audited as described above, to verify that the updated algorithm is still sufficiently secure.

In some examples, sending the differential firmware update characteristic data 316 to the authorizing entity 318 may be performed as part of or before or after the performance of a remote attestation protocol. For example, the trusted execution environment 312 may send at least one message (e.g. a digest, or a metadata document signed by a trusted third party, such as a Software Bill of Materials (SBOM)) to the authorizing entity 318 to perform remote attestation of the trusted execution environment 312 by the authorizing entity 318. The remote attestation may be used to prove to the authorizing entity 318 the at least one characteristic represented by the differential firmware update characteristic data 316, such as the algorithm that is to be applied within the trusted execution environment 312. Such a remote attestation protocol may also or instead prove to the authorizing entity 318 that the trusted execution environment 312 is a legitimate trusted execution environment and not a different execution environment owned by a malicious party attempting to pose as the trusted execution environment 312. At least one key (such as the at least one key 120, 220 discussed with reference to FIGS. 2 and 3) may be sent from the authorizing entity 318 to the trusted execution environment 312 after remote attestation of the trusted execution environment 312 by the authorizing entity 318, e.g. after the remote attestation has been successfully completed.

It is to be understand that there are various remote attestation protocols. In one example, the trusted execution environment 312 provide the authorizing entity 318 with a digest. The authorizing entity 318 then looks up the digest in a database, and determines whether the digest received from the trusted execution environment 312 matches the digest retrieved from the database. In another example, the authorizing entity 318 presents the trusted execution environment 312 (in this example, the characteristic data component 314 within the trusted execution environment 312) with a cryptographic nonce. A cryptographic nonce may be a random or pseudo-random number used just once in a cryptographic communication such that when the remote attestation protocol is performed again at a later time, the cryptographic nonce sent to the characteristic data component 314 will have changed. In this example, the characteristic data component 314 generates hash data by computing a hash of a memory space associated with the trusted execution environment 312, which for example includes a representation of the at least one characteristic associated with generation of the output differential firmware update. In this remote attestation protocol, the characteristic data component 314 then generates an attestation report containing the hash and the cryptographic nonce. In this case, the differential firmware update characteristic data 316 sent to the authorizing entity 318 may include this attestation report. The use of the cryptographic nonce to generate the attestation report means that an attestation report from a previous attestation at an earlier time cannot be used because the cryptographic nonce and therefore the attestation report would differ. This prevents a malicious party from using a previous attestation report to pose as the trusted execution environment 312. Using this remote attestation protocol, the attestation report may be signed in some examples using a private key embedded into a computing system hosting the trusted execution environment 312. This private key may have been embedded into the computing system during manufacture of the computing system. The signed attestation report may then be sent, along with a public key corresponding to the private key, to the authorizing entity 318. In a further example, the trusted execution environment 312 sends a SBOM and an attestation report to the authorizing entity 318. The authorizing entity 318 then validates the signed SBOM and determines whether a digest in the SBOM matches a digest in the attestation report.

The signature of the attestation report and the public key may be used by the authorizing entity 318 to verify that the attestation report was obtained from the trusted execution environment 312. The authorizing entity 318 may use the hash data to determine that the trusted execution environment 312 is authorized to generate the differential firmware update. This may include the authorizing entity 318 using a third party verification service trusted by the authorizing entity 318. The third party verification service may for example include a database that maps hash values to levels of trust such that the authorizing entity 318 can use the database to evaluate whether the trusted execution environment 312 can be trusted. Typically, the third party verification service is used to establish whether or not the public key (corresponding to the private key that may have been embedded at the time of manufacture of the computing system) is trustworthy. This acts as a proxy for establishing whether the trusted execution environment 312 is trustworthy. If, for any reason, the third party verification service suspects that the trusted execution environment 312 is not trustworthy, e.g. due to an identified attack or other intelligence, the third party verification service can notify the authorizing entity 318 that there is a reason to doubt the trustworthiness of the trusted execution environment 312. However, in the case that the trusted execution environment 312 can be trusted (and that the at least one characteristic satisfies a predefined condition, which may be verified separately or as part of the remote attestation protocol, e.g. if the differential firmware update characteristic data 316 sent to the authorizing entity 318 includes the attestation report), the authorizing entity 318 determines that the trusted execution environment 312 is authorized to generate the differential firmware update using the methods described herein, and sends the at least one key to the trusted execution environment 312.

Figure 5:
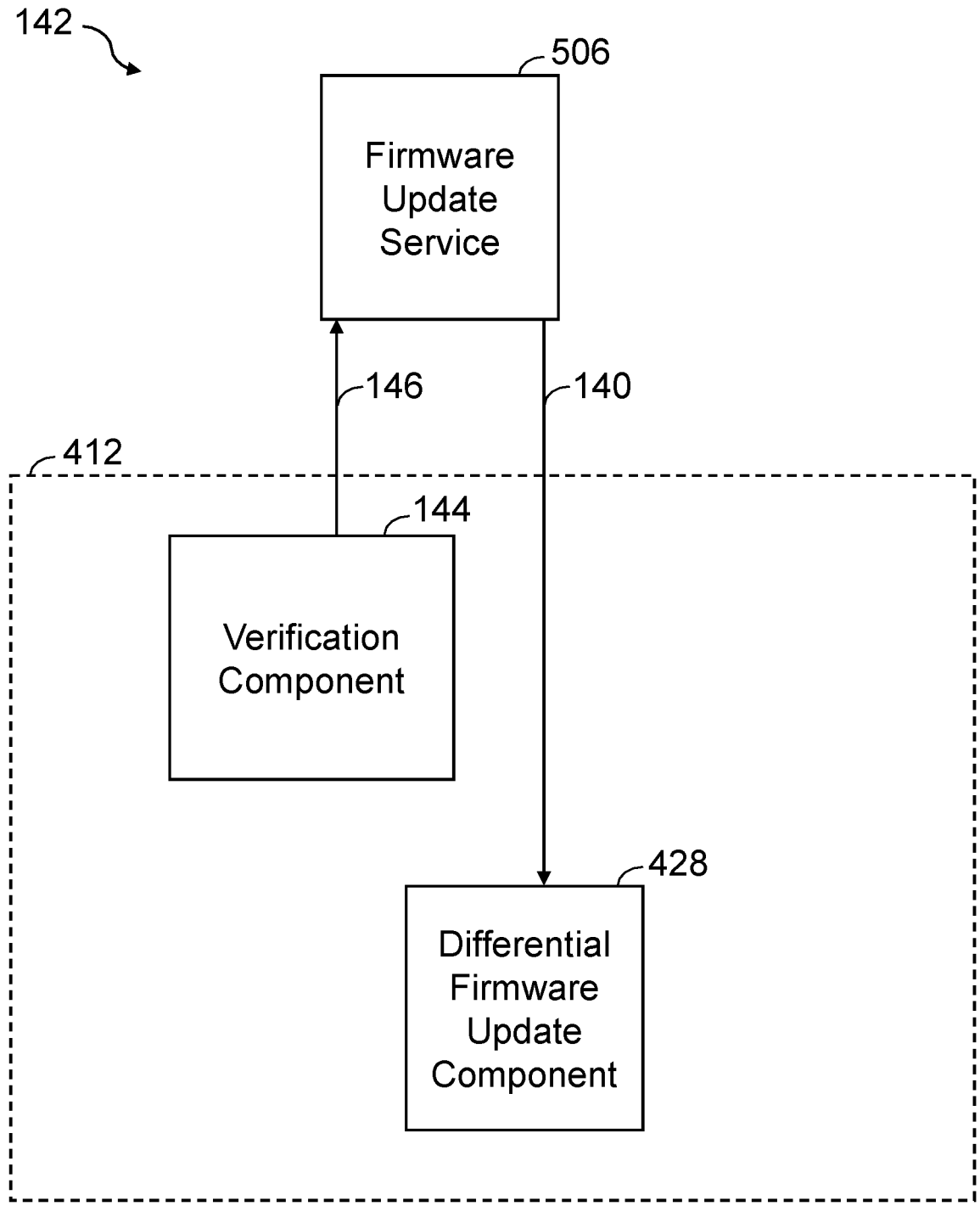
FIG. 5 is a schematic diagram showing a method of obtaining computer program code to implement a differential firmware update calculation algorithm according to examples.

FIG. 5 is a schematic diagram showing a method 142 of obtaining code 140, for example computer program code, to implement a differential firmware update calculation algorithm (referred to herein as an algorithm) according to examples. Features of FIG. 5 similar to corresponding features of FIG. 2 are labelled with the same reference numeral but incremented by 300; corresponding descriptions are to be taken to apply.

In the method 142 of FIG. 5, the trusted execution environment 412 sends at least one message to the firmware update service 506 to perform remote attestation of the trusted execution environment 412 by the firmware update service 506 using a remote attestation protocol. In this case, a verification component 144 sends the at least one message 146 to the firmware update service 506, for example to prove the contents of a portion of memory of the trusted execution environment 412 to the firmware update service 506. As described above with reference to FIG. 4, there are various remote attestation protocols or protocols that may be used in this case to prove to the firmware update service 506 that the trusted execution environment 412 is a legitimate trusted execution environment and not a malicious party posing as the trusted execution environment 412. It is to be understood that the detailed example of a remote attestation protocol described above with reference to FIG. 4 may also be implemented here in the method 142 of FIG. 5. However, in the method 142 of FIG. 5, it is the firmware update service 506 that presents the verification component 144 with the cryptographic nonce, and the hash data in this case is generated by the verification component 144 computing a hash of the portion of memory of the trusted execution environment 412.

In this case, the trusted execution environment 412 obtains the code 140 to implement the differential firmware update calculation algorithm from the firmware update service 506 after remote attestation of the trusted execution environment 412 by the firmware update service 506. In this way, the remote attestation protocol has provided the required proof that the trusted execution environment 412 is a legitimate trusted execution environment and is hence sufficiently secure for generation of the output differential firmware update. The code 140 to implement the algorithm can therefore be sent to the trusted execution environment 412 with a low risk of exposure to a malicious party. Although not shown in FIG. 5, a characteristic data component within the trusted execution environment 412 such as the characteristic data component 314 in FIG. 4 may in some examples obtain the code 140 to implement the algorithm after completion of the remote attestation described with reference to FIG. 5.

Figure 6:
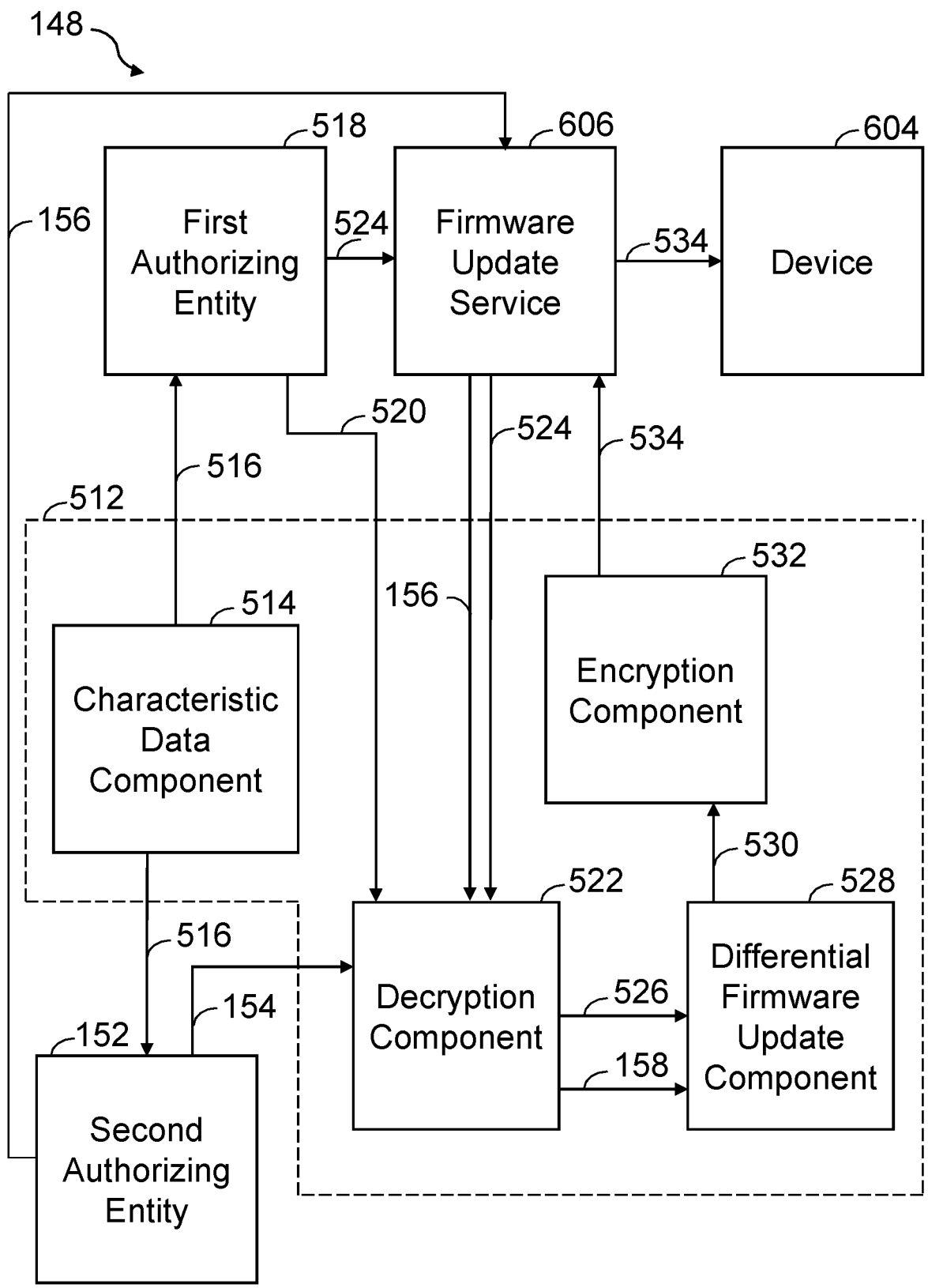
FIG. 6 is a schematic diagram showing a method of generating a differential firmware update for updating firmware associated with a device according to further examples.

FIG. 6 is a schematic diagram showing a method 148 of generating a differential firmware update for updating firmware associated with a device 604 according to further examples. Features of FIG. 6 similar to corresponding features of FIG. 2 are labelled with the same reference numeral but incremented by 400; corresponding descriptions are to be taken to apply.

In the method 148 of FIG. 6, a first authorizing entity 518 is arranged to authorize use of at least one version of a first firmware portion of firmware for the calculation of a differential firmware update, and a second authorizing entity 152 is arranged to authorize use of at least one version of a second firmware portion of the firmware for the calculation of the differential firmware update. The first and/or second authorizing entities 518, 152 may themselves have been authorized to authorize use of the first and/or second firmware portions in the differential firmware update. A third entity may authorize the first and/or second authorizing entity 518, 152 or one of the first and second authorizing entity 518, 152 may authorize the other one. In one example, the third entity authorizes the first and second authorizing entities to provide key(s) to decrypt the first and second firmware portions to a trusted execution environment 512, and may additionally or alternatively authorize the trusted execution environment 512 to provide differential firmware updates based on the first and/or second firmware portions to a device 604. In such cases, the trusted execution environment 512 may check that the first and/or second firmware portions (and/or the key(s) to decrypt the first and/or second firmware portions) are received from the correct authorizing entities (i.e. an authorizing entity that has been authorized to provide that particular data). If the incorrect authorizing entity has provided a firmware portion and/or a key to the trusted execution environment 512 (e.g. if the first authorizing entity 518 is solely authorized to provide data related to the first firmware portion but instead provides a version of the second firmware portion), the trusted execution environment 512 may refuse to perform further actions, such as computing the differential firmware update, distributing the differential firmware update or signing the differential firmware update. In such cases, the device 604 may determine that the differential firmware update is untrustworthy if it is not signed and may hence decline to implement the update. This is merely an example, though, and in other cases, the trusted execution environment 512 may instead respond differently upon receipt of a message from an unauthorized entity, e.g. by rejecting the message.

In the method 148 of FIG. 6, a first authorizing entity 518 sends a plurality of encrypted versions of a first firmware portion 524 of the firmware to a firmware update service 606. The first authorizing entity 518 may be similar to the authorizing entity 112, 212, 312, 412 discussed with reference to FIGS. 2 to 4. The first authorizing entity 518 in this example is associated with an author of at least one version of the first firmware portion 524 (which may be referred to as a first author), and is permitted to authorize use of these version(s) of the first firmware portion in the generation of an output differential firmware update. In this example, the plurality of encrypted versions of the first firmware portion 524 are encrypted using a first at least one key 520, e.g. in a similar manner to the encryption of the firmware portion using the at least one key 120 described with reference to FIG. 2.

A second authorizing entity 152 also sends a plurality of encrypted versions of a second firmware portion 156 to the firmware update service 606. The second firmware portion is for example different from the first firmware portion. For example, the first and second firmware portions may represent different code segments of the firmware. The second authorizing entity 152 may be similar to the first authorizing entity 518, but associated with an author of at least one version of the second firmware portion 156 (which may be referred to as a second author). The first and second authors may be different from each other. In other words, there may be multiple different firmware authors each contributing information to be used by the trusted execution environment 512 to generate the output differential firmware update. In the example of FIG. 6, the second authorizing entity 152 is a computing system operated by the second author. In other examples, though, the second authorizing entity 152 may be a different computing system operated entity different from the second author, but that has been permitted by the second author to distribute the second firmware portion and/or updates of the second firmware portion. The plurality of encrypted versions of the second firmware portion 156 are encrypted using a second at least one key 154. The first and second key(s) 520, 154 are different from each other in some examples. This further enhances security as it means that the first authorizing entity 518 is unable to decrypt the plurality of encrypted versions of the second firmware portion 156 and the second authorizing entity 152 is unable to decrypt the plurality of encrypted versions of the first firmware portion 524. This can be beneficial where the first and second authorizing entities 518, 152 are mutually distrustful.

In the method 148 of FIG. 6, the characteristic data component 514 sends differential firmware update characteristic data 516 from the trusted execution environment 512 to the first and second authorizing entities 518, 152. The differential firmware update characteristic data 516 may be generated e.g. as described with reference to FIG. 4, and is indicative of at least one characteristic associated with generation of the output differential firmware update within the trusted execution environment 512. In this example, the differential firmware update characteristic data 516 sent to the second authorizing entity 152 is identical to the differential firmware update characteristic data 516 sent to the first authorizing entity 518. However, in other examples, differential firmware update characteristic data sent to each authorizing entity may differ, for example if different conditions (such as a different algorithm) are to be applied to generate differential firmware updates using the first and second firmware portions.

The first authorizing entity 518 determines, based on the differential firmware update characteristic data 516, whether the trusted execution environment 512 is authorized to generate a differential firmware update of the first firmware portion. If the trusted execution environment 512 is authorized, the first authorizing entity 518 sends the first at least one key 520 to the trusted execution environment 512. In this way, the trusted execution environment 512 is authorized by the first authorizing entity 518 to generate the differential firmware update based on the first firmware portion.

In a similar manner, the second authorizing entity 152 determines, based on the differential firmware update characteristic data 516, whether the trusted execution environment 512 is authorized to generate a differential firmware update of the second firmware portion. If the trusted execution environment 512 is authorized, the second authorizing entity 152 sends the second at least one key 154 to the trusted execution environment 512. In this way, the trusted execution environment 512 is authorized by the second authorizing entity 152 to generate the differential firmware update based on the second firmware portion.

In the method 148 of FIG. 6, the trusted execution environment 512 obtains the plurality of encrypted versions of the second firmware portion 156 of the firmware as well as the plurality of encrypted versions of the first firmware portion 524. In this example, a decryption component 522 of the trusted execution environment 512 obtains the plurality of encrypted versions of the first and second firmware portions 524, 156 from the firmware update service 606, although this is merely an example.

In the method 148 of FIG. 5, the decryption component 522 decrypts the plurality of encrypted versions of the first firmware portion 524 using the first at least one key 520 to obtain a plurality of decrypted versions of the first firmware portion 526. The decryption component 522 also decrypts the second firmware portion 156 using the second at least one key 154 to obtain a plurality of decrypted versions of the second firmware portion 158. As in FIGS. 2 and 3, it is to be appreciated that further examples are envisaged that are otherwise similar to FIG. 6, but in which a single encrypted version of the first firmware portion 524 and a single encrypted version of the second firmware portion 156 are each obtained and decrypted, rather than obtaining a plurality of encrypted versions of each of the first and second firmware portions 524, 156. In such cases, an output differential firmware update 530 may be generated using a plurality of versions of the first firmware portion, including the decrypted first version of the firmware portion and a second version of the first firmware portion, and further using a plurality of versions of the second firmware portion including a decrypted first version of the second firmware portion and a second version of the second firmware portion. The second versions of the first and second firmware portions may have been decrypted previously (e.g. using the same or a different key as that used to decrypt the first versions of the first and second firmware portions, respectively), and may have been obtained from the same or a different source than the first versions of the first and second firmware portions.

The plurality of versions of the first and second firmware portions 526, 158 are sent to a differential firmware update component 528 of the trusted execution environment 512. The differential firmware update component 528 generates an output differential firmware update 530 using the plurality of versions of the first and second firmware portions 526, 158. The method 148 of FIG. 6 therefore provides a mechanism of generating an output differential firmware update 530 in the case where there are two authorizing entities each seeking to deploy an update of respective firmware portions of the firmware associated with the device 604. The method 148 may be beneficial in cases where the first authorizing entity 518 and the second authorizing entity 152 do not trust each other and/or where neither of the authorizing entities 518, 152 trusts the firmware update service 606 or vice versa. In these cases, the trusted execution environment 512 provides an environment that has proved its legitimacy, using the methods described above, to all three of these entities. The trusted execution environment 512 can therefore be trusted not to generate malicious code and to use the confidential or otherwise sensitive information from each of these entities to generate the output differential firmware update 530.

In some examples, an individual differential firmware update may be generated for each firmware portion, e.g. where each firmware portion corresponds to a different module of the firmware. In other words, independent differences can be computed for each of the first and second firmware portions (e.g. corresponding to first and second modules). For example, the differential firmware update component 528 may generate first and second differential firmware updates of the first and second firmware portions, which may e.g. form part of the firmware currently running on the device 604. In such cases, the output differential firmware update 530 includes the first and second differential firmware updates. The computed first and second differential firmware updates may then be combined, e.g. by concatenation or by storing the first and second differential firmware updates at known offsets relative to each other. In this way, a single firmware image corresponding to the output differential firmware update 530 may be generated for deployment to the device 604.

In examples, such as that shown in FIG. 6, a single output differential firmware update 530 is generated within the trusted execution environment 512. For example, the differential firmware update component 528 may combine a first one of the plurality of versions of the first firmware portion 524 with a first one of the plurality of versions of the second firmware portion 156 to generate a first firmware image. The first ones of the first and second firmware portions 524, 154 may be combined in any suitable manner, e.g. by concatenation or by storing a first file representative of the first one of the first firmware portion 524 at a known offset relative to a second file representative of the first one of the second firmware portion 156. In this case, the differential firmware update component 528 generates the output differential firmware update 530 using the first firmware image and a second firmware image, which in this example includes a combination of a second one of the plurality of decrypted versions of the first firmware portion 524 with a second one of the plurality of decrypted versions of the second firmware portion 156. The second ones of the first and second firmware portions 524, 154 may also be combined using any suitable manner. The first firmware image in this example may correspond to the new first and second firmware portions that the first authorizing entity 518 and the second authorizing entity 152 aim to deploy to the device 604, and e.g. corresponds to the updated firmware image to be deployed on the device 604 (which includes a desired update). The second firmware image in this example may correspond to a combination of the active first and second firmware portions currently running on the device 604, and e.g. corresponds to a firmware image that is currently deployed on the device 604. The output differential firmware update 530 may therefore be generated by combining the first and second firmware portions and calculating the difference between two firmware images (e.g. corresponding to the current firmware image and an updated firmware image) rather than calculating an individual differential firmware update for each firmware portion (e.g. corresponding to a respective module of the firmware). This may simplify the process of deploying differential firmware updates to the device 604 because the device 604 will receive the single differential firmware update rather than multiple differential firmware updates, each corresponding to a respective firmware portion. This may reduce the energy used by the device 604 to obtain and install differential firmware updates by reducing the number of firmware updates to be installed at the device 604.

In one case, the differential firmware update component 528 receives the first and/or second ones of the first and second firmware portions for use in generating the output differential firmware update 530 in an intermediate format, e.g. an Executable and Linkable Format (ELF), rather than receiving firmware images. In this case, the differential firmware update component 528 may perform the linking of the respective versions of the first and/or second ones of the first and second firmware portions, to generate the first and second firmware images, respectively, to exploit link-time optimizations that may be available. Linking involves determining where to locate each symbol (which is e.g. a variable, data structure, or callable code block) within a firmware image, e.g. by selecting the address of each symbol, as well as determining the order in which the symbols appear. The differential firmware update component 528 may additionally prune (or otherwise remove) unused symbols, eliminate duplicate code blocks, and/or reorder code to improve spatial locality, as part of the linking process. In other cases, though, generating the first and second firmware images involves linear relocation rather than full linking of the respective versions of the first and/or second ones of the first and second firmware portions. In these other cases, the differential firmware update component 528 does not select the order of the symbols but instead installs successive symbols at the next available offset, in order.

In further examples, the differential firmware update component 528 may generate the output differential firmware update 530 by exploiting redundancies between code segments across the first and second firmware portions. This may be beneficial for decreasing the overall size of the differential firmware update 530 which may save network resources and energy consumed by the device 604. This for example allows for a more efficient deployment of the output differential firmware update 530. In one example, the plurality of versions of the first firmware portion 524 includes a first code segment and the plurality of versions of the second firmware portion 156 includes a second code segment identical to the first code segment. In this case, the output differential firmware update 530 may be generated using the first code segment without using the second code segment or using the second code segment without using the first code segment.

In the method 148 of FIG. 6, the output differential firmware update 530 is encrypted by an encryption component 532 of the trusted execution environment 512, in a similar manner to that described with reference to FIG. 2. In examples, the output differential firmware update 530 is encrypted using a key that is unavailable to the first and second authorizing entities 518, 152, i.e. that differs from the first and second key(s) 520, 154, but which is for example shared with the device 604. This further enhances security compared to other examples in which the encrypted differential firmware update 534 can be decrypted by the first and/or second authorizing entities 518, 512. The encrypted differential firmware update 534 is sent to the firmware update service 606, which deploys the encrypted differential firmware update 534 to the device 604.

Figure 7:
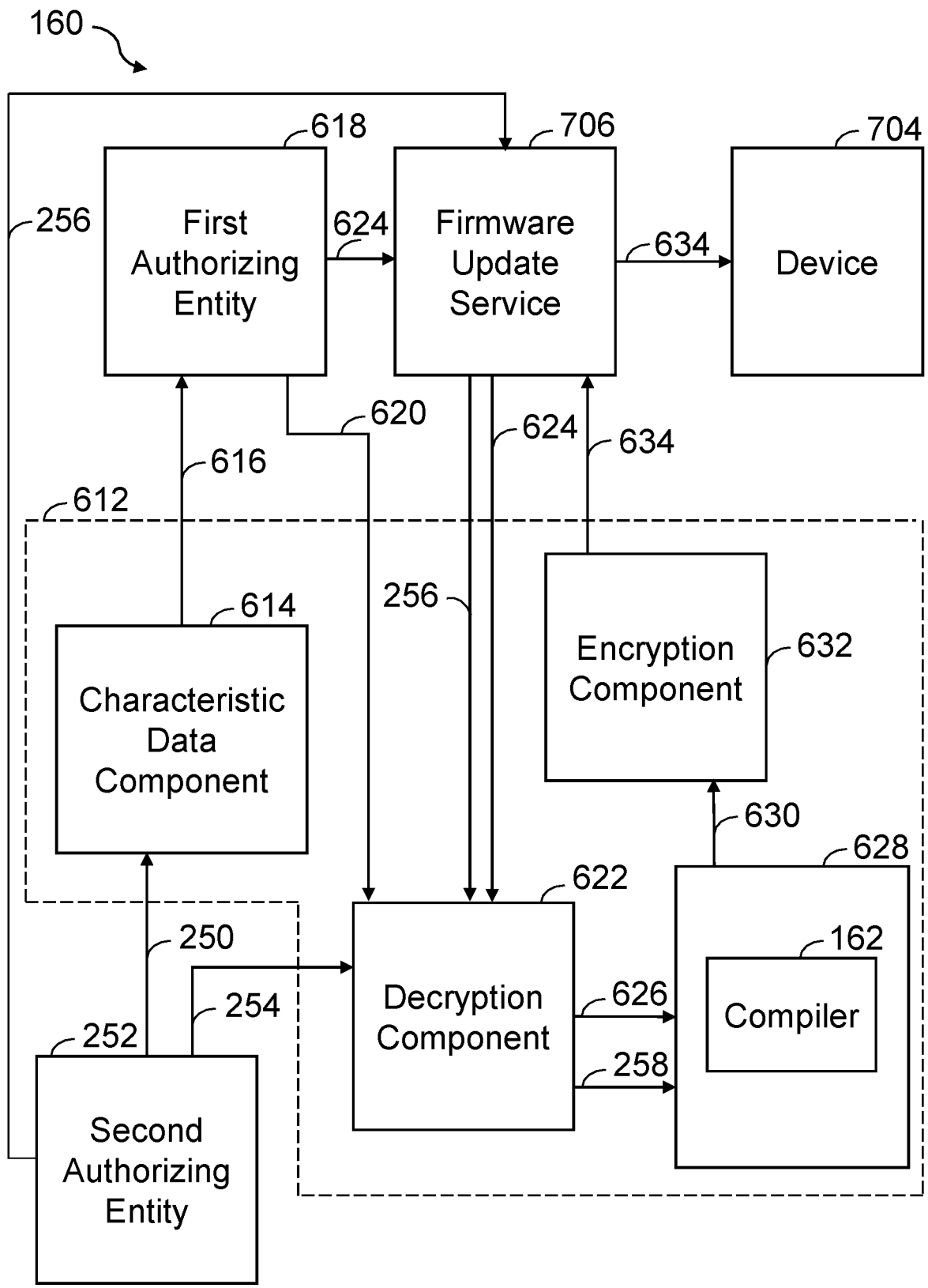
FIG. 7 is a schematic diagram showing a method of generating a differential firmware update for updating firmware associated with a device according to further examples.

Another example in which a differential firmware update component may exploit redundancies between code segments across first and second firmware portions is shown in FIG. 7, which is a schematic diagram showing a method 160 of generating a differential firmware update for updating firmware associated with a device 704 according to further examples. The method 160 of FIG. 7 is similar to the method 148 of FIG. 6, apart from the differential firmware update component 628. Features of FIG. 7 similar to corresponding features of FIG. 6 are labelled with the same reference numeral but incremented by 100; corresponding descriptions are to be taken to apply.

First and second authorizing entities 618, 252 send a plurality of encrypted versions of a first and second firmware portion 624, 256, respectively, to a firmware update service 706, which provides the plurality of encrypted versions 624, 256 to a trusted execution environment 612. A characteristic data component 614 of the trusted execution environment 612 sends differential firmware update characteristic data 616 to the first and second authorizing entities 618, 652, which is used to determine whether the trusted execution environment 612 is authorized to generate differential firmware updates of the first and second firmware portions. If the trusted execution environment 612 is authorized, the first and second authorizing entities 618, 652 send a first and a second at least one key 620, 254 to the trusted execution environment 612, which are used by a decryption component 622 of the trusted execution environment 612 to decrypt the plurality of encrypted versions of a first and second firmware portion 624, 256, respectively. The decrypted versions of the first and second firmware portion 626, 258 are sent to the differential firmware update component 628. As in FIGS. 2, 3 and 6, it is to be appreciated that further examples are envisaged that are otherwise similar to FIG. 7, but in which a single encrypted version of the first firmware portion 624 and a single encrypted version of the second firmware portion 256 are each obtained and decrypted, rather than obtaining a plurality of encrypted versions of each of the first and second firmware portions 624, 256.

In the method 160 of FIG. 7, the differential firmware update component 628 includes a compiler 162 which compiles a plurality of source code segments to generate the output differential firmware update 630. The plurality of source code segments in this example includes at least one code segment from the plurality of versions of the first firmware portion 626 and at least one code segment from the plurality of versions of the second firmware portion 158. In this way, the compiler 162 builds the output differential firmware update 630 from a source code level. This allows the differential firmware update component 628 to further exploit redundancies between firmware portions derived from the various firmware authors, for example by removing duplicate code paths across the firmware portions. In other examples, such as that of FIGS. 2, 3 and 6, the plurality of versions of the firmware portion (or the first and/or second firmware portion) that are used to generate an output differential firmware update have been compiled prior to generation of the output differential firmware update, e.g. prior to obtaining of these versions by the trusted execution environment 612.

The output differential firmware update 630 generated by the differential firmware update component 628 in the method 160 of FIG. 7 is encrypted by an encryption component 632 of the trusted execution environment 612. The encrypted differential firmware update 634 is sent to the firmware update service 706, which deploys the encrypted differential firmware update 634 to the device 704.

It is to be understood that the examples of FIG. 6 and FIG. 7 can be readily generalized to cases where there are more than two authorizing entities (e.g. each associated with an author of a different respective firmware portion) contributing to generating the output differential firmware update.

Figure 8:
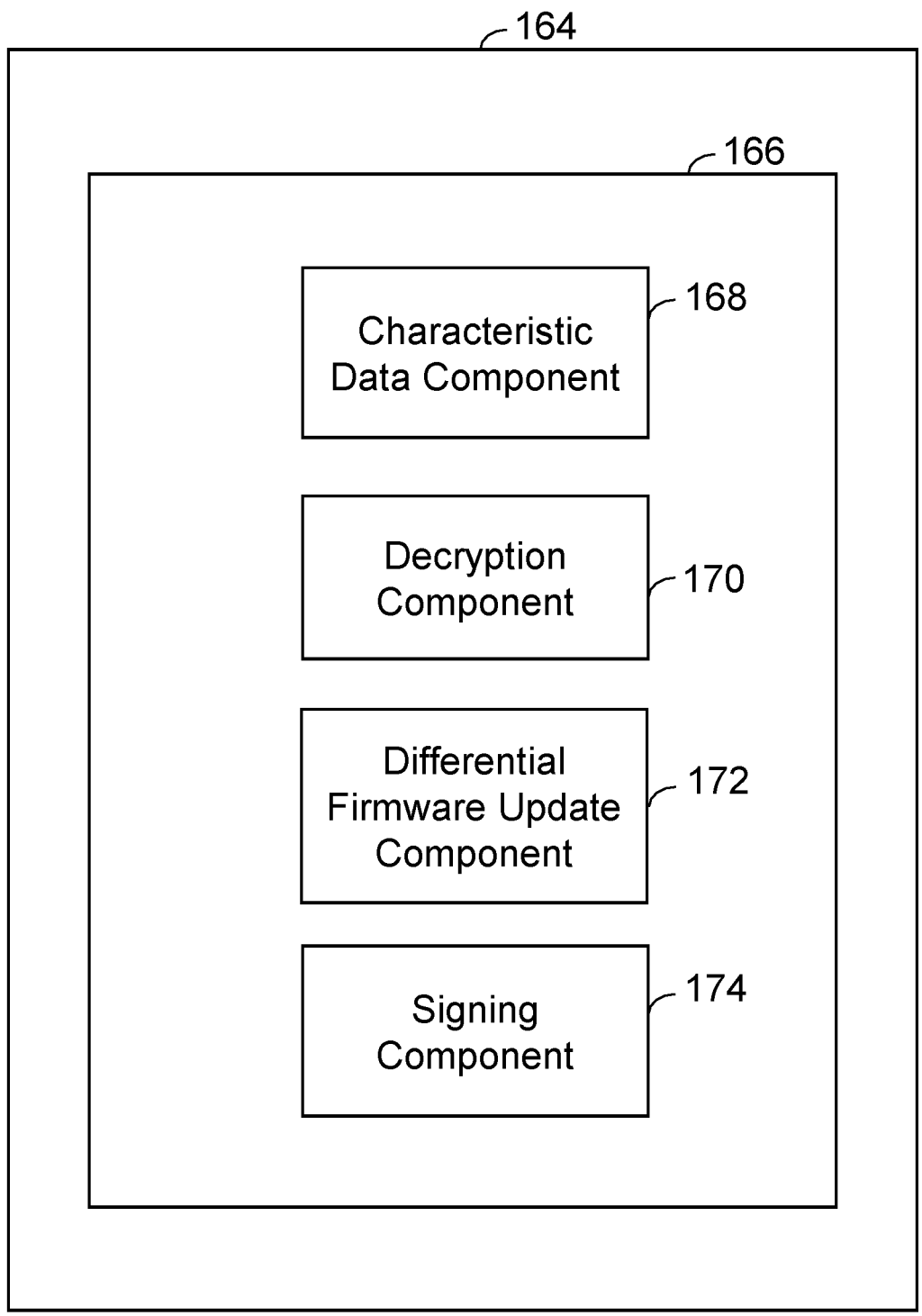
FIG. 8 is a schematic diagram of a computing system for generating a differential firmware update for updating firmware associated with a device according to examples.

FIG. 8 is a schematic diagram showing a computing system 164 for generating an output differential firmware update. The computing system 164 includes a trusted execution environment 166, such as those described in the examples of FIGS. 2 to 7 above. The trusted execution environment 166 in this example includes a characteristic data component 168 (which may be similar to the characteristic data components 114, 214, 314, 514, 614 of FIGS. 2, 3, 4, 6 and 7), a decryption component 170 (which may be similar to the decryption components 122, 222, 522, 622 of FIGS. 2, 3, 6 and 7) and a differential firmware update component 172 (which may be similar to the differential firmware update components 128, 228, 428, 528, 628 of FIGS. 2, 3, 5, 6 and 7). The trusted execution environment 166 may additionally include at least one of the other components of the example trusted execution environments 112-612 of FIGS. 2 to 7, such as an encryption component (which may be similar to the encryption components 132, 232, 532, 632 of FIGS. 2, 3, 6 and 7).

The computing system 164 may for example be or include at least one processor (e.g. in the form of or otherwise comprising processor circuitry) configured to implement the methods described herein. It is to be understood, however, that the at least one processor in this case may additionally be configured to perform other processing and/or controlling functions. The at least one processor may for example include a general processor such as a central processing unit (CPU). The at least one processor in this example is configured to implement at least one of the characteristic data component 168, the decryption component 170 and/or the differential firmware update component 172. In other words, the same underlying hardware (such as at least one processor) may be used to implement a plurality of different logical components of the trusted execution environment 166. In general, operations performed by any of the logical components of the trusted execution environment 166 may be carried out by hardware and/or software. Each of these components may be implemented using machine readable instructions and suitably programmed or configured hardware, such as circuitry. Each of these components can include a microprocessor, microcontroller, processor module or subsystem, programmable integrated circuit, programmable gate array or other computing device.

The trusted execution environment 166 in this example further comprises storage (not shown in FIG. 8), such as computer-useable volatile and/or non-volatile memory configured to store information and/or instructions to implement the functionality of the trusted execution environment 166. The storage of the trusted execution environment 166 may be considered to correspond to local storage of the trusted execution environment 166. In some examples, each of the components of the trusted execution environment 166 may each include their own storage components within the trusted execution environment 166 or may instead use a shared storage component within the trusted execution environment 166. The storage of the trusted execution environment 166 for example corresponds to a particular storage region of storage of the computing system 164, such as a particular memory area of a main memory of the computing system 164.

The trusted execution environment 166 of FIG. 6 also includes a signing component 174 for signing update data associated with the output differential firmware update before sending to either the firmware update service or the authorizing entity. The update data may for example represent the encrypted differential firmware update (if signing occurs after encryption) or the differential firmware update prior to encrypted (if signing occurs before encryption). In some cases, though, the differential firmware update may be signed without being encrypted, previously or subsequently. In other cases, the update data may be derived from the output differential firmware update without including the output differential firmware update itself. For example, the update data may be metadata (e.g. including a digest of the output differential firmware update) associated with the output differential firmware output.

To sign the update data, the signing component may obtain a further key, e.g. from the authorizing entity or a different entity, such as the device 604 or a computer system associated with the device 604, for signing the update data. For example, the device owner may provision the further key and a policy that authenticates the authorizing entity's public key to ensure that the authorizing entity is trusted. If the authentication of the authorizing entity is unsuccessful, the update data will not be signed. In this way, the device can verify that each of at least one authorizing entity (e.g. each of a plurality of firmware authors) is appropriately authorized. In examples in which the further key is provided to the signing component 174, the update data can be signed, by the signing component 174, using the further key. The further key may be sent from the authorizing entity to the trusted execution environment 166 using any suitable key exchange protocol. In this example, the further key is a signing key. Signing the update data with the signing key may include calculating a signature based on the update data and the signing key. The signature may be used by the device that receives the update data (and the output differential firmware update itself) to verify that the output differential firmware update has not been modified or replaced since being generated within the trusted execution environment, further enhancing security. This is merely an example, though, and another case, signing may be omitted or performed differently. For example, rather than sending a further key to the trusted execution environment 166, the authorizing entity may instead sign a certificate including a public key sent to the authorizing entity by the trusted execution environment 166.

In one example, the signature may be any type of signature, such as a signature generated using the Edwards-curve Digital Signature Algorithm (EdDSA), the Elliptic Curve Digital Signature Algorithm (ECDSA), the Rivest-Shamir-Adleman (RSA) algorithm, or a lattice-based or hash-based signature. In this example, an asymmetric key algorithm may be applied where the signing key is a private key sent to the trusted execution environment from the authorizing entity. If the device receives a signed message (e.g. signed by the signing component 174 using the signing key), the device can for example compute a digest of the message and then use a corresponding public key to decrypt the signature and compare the resulting digest to the digest it has already computed. in this way, the device can determine whether the differential firmware update has been modified or replaced since being generated within the trusted execution environment. If digests match, the device may install the differential firmware update. Otherwise, this indicates that the differential firmware update may have been tampered with, potentially by malicious party, since being generated. In this case, the device may prevent installation of the differential firmware update so as to avoid potentially malicious code being installed on the device. The provision of the signing key by the authorizing entity to the trusted execution environment may be after the trusted execution environment has sent the differential firmware update characteristic data described above. In this way, the authorizing entity has deemed the trusted execution environment trustworthy enough to allocate signing authority of the update data to the trusted execution environment. Allocating signing authority to the trusted execution environment, as well as providing the at least one key for decrypting the version(s) of the firmware portion, may be useful in cases where the authorizing entity trusts the trusted execution environment not only to decrypt the version(s) of the firmware portion, but also to sign the update data on behalf of the authorizing entity. In other words, there may be two trust levels that may be assigned to the trusted execution environment: a first trust level, where the trusted executed environment is deemed trustworthy enough to decrypt the version(s) of the firmware portion (or firmware portions), and a second (higher) trust level, where the executed environment is deemed trustworthy enough to both decrypt the version(s) of the firmware portion(s), and to sign the update data on behalf of the authorizing entity. In further examples, there may be two trusted execution environments, each with a different trust level (e.g. one trusted to provide decryption key(s) for decrypting the version(s) of the firmware portion(s), and another with signing authority). In such cases, the trusted execution environments for example have a trust relationship between each other, which may be verified by mutual remote attestation of each other.

In an example where the trusted execution environment does not possess this signing authority, for example because the authorizing entity has not sent the signing key to the trusted execution environment, the encrypted differential firmware update may be sent from the trusted execution environment to the authorizing entity as shown in FIG. 3. In this example, the authorizing entity may inspect the encrypted differential firmware update as described above and use the signing key to sign the encrypted differential firmware update (or update data associated with the encrypted differential firmware update) before deployment to the device (although in other examples, the differential firmware update need not be encrypted).

However, in an example where the trusted execution environment does possess this signing authority, for example because the authorizing entity has sent the signing key to the trusted execution environment, the update data may be signed within the trusted execution environment using the signing key and sent to the firmware update service for deployment to the device. In this way, there may be a further reduction in the burden of managing firmware updates experienced by the authorizing entity by delegating the signing of the update data from the authorizing entity to the trusted execution environment.

Further examples are envisaged. For example, the trusted execution environment and the firmware update service in FIGS. 2, 3, 5, 6 and 7 are shown as separate entities. However, it is to be understood that, in some cases, the trusted execution environment may be included within the firmware update service such that the trusted execution environment is a component of the firmware update service. This may be the case where a device management system, which includes the firmware update service, also includes the trusted execution environment to generate the differential firmware update. In this way, a single entity, for example a cloud service provider, may liaise with the authorizing entity to manage the firmware updates of a large number of devices as well as performing the other device management tasks such as troubleshooting devices and managing data collected by the devices for example.

Furthermore, in the examples above, the trusted execution environment is illustrated as including various different logical components. This is for ease of illustration, and it is to be appreciated that, in other examples, functionality described as being performed by one component in one of the examples herein may be performed by a different component or the functionality of a plurality of components may be performed be a single component.

In examples above, the trusted execution environment includes an encryption component for encrypting the output differential firmware update before sending to either the firmware update service or the authorizing entity for deployment to the device. In some cases, though, the output differential firmware update may not be encrypted before being sent to the firmware service, the authorizing entity and/or the device, e.g. if the device lacks the capacity to decrypt data.

In the example of FIG. 2, the plurality of encrypted versions of the firmware portion 124 are encrypted by the authorizing entity 118 and then sent to the firmware update service 206 for sending to the trusted execution environment 112. In another case, though, as explained further above, the firmware update service 206 obtains a first version of the firmware portion (for use in generating the output differential update) from the authorizing entity 118. The first version of the firmware portion is an encrypted version of the firmware portion, which has been encrypted using a key (e.g. the at least one key 120 of FIG. 2), which is shared with the trusted execution environment 112 to generate the output differential firmware update. However, rather than obtaining a second version of the firmware portion from the authorizing entity 118, in this example, the second version of the firmware portion is obtained from a different entity, such as the device 204 itself, e.g. by querying the device 204 to obtain the currently installed version of the firmware portion. This allows a differential firmware update to be computed against an unknown version of the firmware portion (e.g. obtained from a different source than the authorizing entity 118). The key 120 in such examples is typically not shared with the firmware update service 206, to maintain the security of the first version of the firmware portion. The second version of the firmware portion may be unencrypted or may be encrypted by the different entity, e.g. the device 204. If the second version of the firmware portion is an encrypted second version of the firmware portion, the encrypted second version of the firmware portion may be encrypted using a further, different, key than that used to encrypt the first version of the firmware portion, in which case the encrypted second version of the firmware portion can be decrypted by the trusted execution environment 112 using existing cryptographic protocols. In other cases, though, the authorizing entity 118 may share the key 120 used to encrypt the first version of the firmware portion with the device 204, allowing the device 204 to use the same key 120 to encrypt the second version of the firmware portion. The trusted execution environment 112 can then use the key 120 received from the authorizing entity 118 to decrypt both the encrypted first and second versions of the firmware portion.

It is to be appreciated that this approach may be combined with any of the examples herein, e.g. in order to compute a differential firmware update with respect to an unknown version of a firmware portion. In particular, as noted above, further examples are envisaged which are otherwise similar to FIGS. 3, 6 and 7, but in which at least one of the versions of the firmware portion (or the first and/or second firmware portions) is obtained from a different entity than the authorizing entity (or the first and/or second authorizing entities 518, 618, 152, 252 in the case of FIGS. 6 and 7). In such cases, the at least one of the versions may not be encrypted or may be encrypted by a different entity than the authorizing entity (or the first and/or second authorizing entities 518, 618, 152, 252 in the case of FIGS. 6 and 7), using the same key and/or a different key than that used to encrypt at least one of the versions of the firmware portion obtained from the authorizing entity (or the first and/or second authorizing entities 518, 618, 152, 252 in the case of FIGS. 6 and 7).

In yet further cases, the trusted execution environment 112 may obtain at least one encrypted version of the firmware portion from another entity than the firmware update service 206. For example, the trusted execution environment 112 may obtain at least one encrypted version of the firmware portion from the authorizing entity 118 and/or the device 204. In such cases, the trusted execution environment 112 may itself store a database keeping a record of the respective versions of the firmware portion and their status.

It is to be understood that any feature described in relation to any one example may be used alone, or in combination with other features described, and may also be used in combination with one or more features of any other of the examples, or any combination of any other of the examples. Furthermore, equivalents and modifications not described above may also be employed without departing from the scope of the accompanying claims.

What is claimed is:

1. A method of generating an output differential firmware update for updating firmware associated with a device, the method comprising:
    sending differential firmware update characteristic data from a trusted execution environment to an authorizing entity, wherein the differential firmware update characteristic data is indicative of at least one characteristic associated with generation of the output differential firmware update within the trusted execution environment;
    obtaining, at the trusted execution environment, a key from the authorizing entity, the trusted execution environment thereby being authorized by the authorizing entity to generate a differential firmware update of a firmware portion of the firmware;
    obtaining, at the trusted execution environment, an encrypted first version of the firmware portion;
    decrypting, within the trusted execution environment, the encrypted first version of the firmware portion using the key to obtain a decrypted first version of the firmware portion; and
    generating, within the trusted execution environment, the output differential firmware update;
    wherein the authorizing entity is a first authorizing entity, the firmware portion is a first firmware portion of the firmware, the key is a first key, and the method comprises:
    sending the differential firmware update characteristic data from the trusted execution environment to a second authorizing entity;
    obtaining, at the trusted execution environment, a second key from the second authorizing entity, the trusted execution environment thereby being authorized by the second authorizing entity to generate a differential firmware update of a second firmware portion of the firmware;
    obtaining, at the trusted execution environment, an encrypted first version of the second firmware portion; and
    decrypting, within the trusted execution environment, the encrypted first version of the second firmware portion using the second key to obtain a decrypted first version of the second firmware portion,
    wherein generating the output differential firmware update comprises generating the output differential firmware update using a plurality of versions of the first firmware portion and a plurality of versions of the second firmware portion, wherein the plurality of versions of the first firmware portion comprise the decrypted first version of the first firmware portion and a second version of the first firmware portion, and the plurality of versions of the second firmware portion comprise the decrypted first version of the second firmware portion and a second version of the second firmware portion.

2. The method of claim 1, comprising:
    obtaining, at the trusted execution environment, computer program code to implement a differential firmware update calculation algorithm for generating the output differential firmware update; and
    generating, within the trusted execution environment, the differential firmware update characteristic data for sending to the authorizing entity, wherein the differential firmware update characteristic data represents at least one characteristic of the differential firmware update calculation algorithm.

3. The method of claim 2, wherein obtaining the computer program code comprises obtaining the computer program code from a firmware update service different from the authorizing entity.

4. The method of claim 3, comprising the trusted execution environment sending at least one message to the firmware update service for the firmware update service to perform remote attestation of the trusted execution environment by the firmware update service using a remote attestation protocol, wherein obtaining the computer program code comprises obtaining the computer program code at the trusted execution environment after performance of the remote attestation of the trusted execution environment by the firmware update service.

5. The method of claim 1, comprising the trusted execution environment sending at least one message to the authorizing entity for the authorizing entity to perform remote attestation of the trusted execution environment by the authorizing entity using a remote attestation protocol, wherein obtaining the key comprises obtaining the key at the trusted execution environment after performance of the remote attestation of the trusted execution environment by the authorizing entity.

6. The method of claim 1, wherein the authorizing entity is associated with an author of the first version of the firmware portion.

7. The method of claim 1, wherein obtaining the encrypted first version of the firmware portion comprises obtaining the first encrypted version of the firmware portion from a firmware update service different from the authorizing entity.

8. The method of claim 1, comprising encrypting, within the trusted execution environment, the output differential firmware update using the key or the second key to generate an encrypted differential firmware update.

9. The method of claim 1, comprising:
obtaining, at the trusted execution environment, a further key from the authorizing entity, wherein the further key is for signing update data associated with the output differential firmware update; and
signing, within the trusted execution environment, the update data using the further key.

10. The method of claim 1, comprising:
combining, within the trusted execution environment, a first one of the plurality of versions of the first firmware portion with a first one of the plurality of versions of the second firmware portion, thereby generating a first firmware image; and
generating the differential firmware update using the first firmware image and a second firmware image, wherein the second firmware image comprises a combination of a second one of the plurality of versions of the first firmware portion with a second one of the plurality of versions of the second firmware portion.

11. The method of claim 1, wherein one of the plurality of versions of the first firmware portion comprises a first code segment and one of the plurality of versions of the second firmware portion comprises a second code segment identical to the first code segment, and the output differential firmware update is generated using the first code segment without using the second code segment.

12. The method of claim 1, wherein generating the output differential firmware update comprises compiling, within the trusted execution environment, a plurality of source code segments comprising at least one code segment from the plurality of versions of the first firmware portion and at least one code segment from the plurality of versions of the second firmware portion.

13. The method of claim 1, wherein the first authorizing entity is associated with an author of at least one of the plurality of versions of the first firmware portion and the second authorizing entity is associated with an author of at least one of the plurality of versions of the second firmware portion.

14. The method of claim 1, wherein the device is an Internet of Things device.

15. A method for use in authorizing a trusted execution environment to generate an output differential firmware update for a device, the method comprising:
obtaining, at a first authorizing entity, differential firmware update characteristic data indicative of at least one characteristic associated with generation of the output differential firmware update within the trusted execution environment;
obtaining, at a second authorizing entity, differential firmware update characteristic data indicative of at least one characteristic associated with generation of the output differential firmware update within the trusted execution environment;
determining, based on the differential firmware update characteristic data, that the trusted execution environment is authorized to generate the output differential firmware update; and
in response to the determining, sending a first key from the first authorizing entity to the trusted execution environment, thereby authorizing the trusted execution environment to generate a differential firmware update of a first firmware portion of the firmware, and sending a second key from the second authorizing entity to the trusted execution environment, thereby authorizing the trusted execution environment to generate a differential firmware update of a second firmware portion of the firmware, wherein the first key is for decrypting an encrypted version of the first firmware portion to generate a decrypted version of the first firmware portion for use in generating the output differential firmware update and the second key is for decrypting an encrypted version of the second firmware portion to generate a decrypted version of the second firmware portion for use in generating the output differential firmware update.

16. The method of claim 15, comprising:
obtaining, at the authorizing entity, the output differential firmware update from the trusted execution environment; and
sending the output differential firmware update from the authorizing entity to the device.

17. The method of claim 15, wherein the authorizing entity is associated with an author of the firmware portion.

18. A computing system for generating an output differential firmware update for updating firmware associated with a device, the computing system comprising a trusted execution environment, the trusted execution environment comprising:
a characteristic data component to send differential firmware update characteristic data to a first authorizing entity and to a second authorizing entity, wherein the differential firmware update characteristic data is indicative of at least one characteristic associated with generation of the output differential firmware update within the trusted execution environment;
a decryption component to:
obtain a first key from the first authorizing entity in response to the sending of the differential firmware update characteristic data to the first authorizing entity;
obtain a second key from the second authorizing entity in response to the sending of the differential firmware update characteristic data to the second authorizing entity;
decrypt an encrypted first version of a first firmware portion of the firmware using the first key to obtain a decrypted first version of the first firmware portion; and
decrypt an encrypted first version of a second firmware portion of the firmware using the second key to obtain a decrypted first version of the second firmware portion; and
a differential firmware update component to generate the output differential firmware update using a plurality of versions of the first firmware portion and a plurality of versions of the second firmware portion, wherein the plurality of versions of the first firmware portion comprise the decrypted first version of the first firmware portion and a second version of the first firmware portion, and the plurality of versions of the second firmware portion comprise the decrypted first version of the second firmware portion and a second version of the second firmware portion.

19. The computing system of claim 18, wherein the trusted execution environment comprises an encryption component to encrypt the output differential firmware update using the first key or the second key to generate an encrypted differential firmware update.

* * * * *